(12) United States Patent
Grube et al.

(10) Patent No.: US 8,621,271 B2
(45) Date of Patent: Dec. 31, 2013

(54) REPROVISIONING A MEMORY DEVICE INTO A DISPERSED STORAGE NETWORK MEMORY

(75) Inventors: Gary W. Grube, Barrington Hills, IL (US); Timothy W. Markison, Mesa, AZ (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 209 days.

(21) Appl. No.: 13/204,039

(22) Filed: Aug. 5, 2011

(65) Prior Publication Data

US 2012/0054581 A1    Mar. 1, 2012

Related U.S. Application Data

(60) Provisional application No. 61/377,428, filed on Aug. 26, 2010.

(51) Int. Cl.
*G06F 11/00* (2006.01)

(52) U.S. Cl.
USPC .......... 714/6.32; 714/769; 714/770; 714/6.22; 714/47.1; 707/609; 707/635; 707/813; 707/827; 709/222; 726/9; 726/3; 713/193; 711/114; 711/158

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |

(Continued)

OTHER PUBLICATIONS

Xin, et al.; Evaluation of Distributed Recovery in Large-Scale Storage Systems; 13th IEEE International Symposium on H gh Performance D str buted Comput ng; Jun. 2004; pp. 172-181.*

(Continued)

*Primary Examiner* — John Trimmings
(74) *Attorney, Agent, or Firm* — Garlick & Markison; Timothy W. Markison

(57) ABSTRACT

A method begins by a processing module identifying a memory device having an expired useable memory life with respect to a legacy storage protocol. The method continues with the processing module extracting data from the memory device. The method continues with the processing module reprovisioning the memory device from the legacy storage protocol to a dispersed storage error coding storage protocol.

13 Claims, 23 Drawing Sheets

(56) References Cited

U.S. PATENT DOCUMENTS

| | | | |
|---|---|---|---|
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,529,834 | B1* | 5/2009 | Birrell et al. ............. 709/226 |
| 7,953,937 | B2* | 5/2011 | Gladwin et al. ............. 711/154 |
| 2001/0023472 | A1* | 9/2001 | Kubushiro et al. ............. 711/103 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0107354 | A1 | 6/2004 | Larsen |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0072400 | A1 | 4/2006 | Anderson et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1* | 7/2007 | Gladwin et al. ............. 705/40 |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2008/0183975 | A1* | 7/2008 | Foster et al. ............. 711/153 |
| 2009/0024818 | A1* | 1/2009 | Yamada et al. ............. 711/170 |
| 2009/0094251 | A1 | 4/2009 | Gladwin et al. |
| 2009/0094318 | A1 | 4/2009 | Gladwin et al. |
| 2009/0254572 | A1 | 10/2009 | Redlich et al. |
| 2009/0254720 | A1* | 10/2009 | Gladwin et al. ............. 711/154 |
| 2010/0023524 | A1 | 1/2010 | Gladwin et al. |
| 2010/0241797 | A1* | 9/2010 | Kitahara ............. 711/103 |
| 2011/0126045 | A1* | 5/2011 | Bennett ............. 714/6.22 |
| 2012/0066517 | A1* | 3/2012 | Vysogorets et al. ............. 713/193 |
| 2012/0066756 | A1* | 3/2012 | Vysogorets et al. ............. 726/9 |
| 2012/0066757 | A1* | 3/2012 | Vysogorets et al. ............. 726/9 |

OTHER PUBLICATIONS

International Search Report and Written Opinion for Application No. PCT/US2011/049296, dated Jan. 19, 2012; 8 pgs.

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

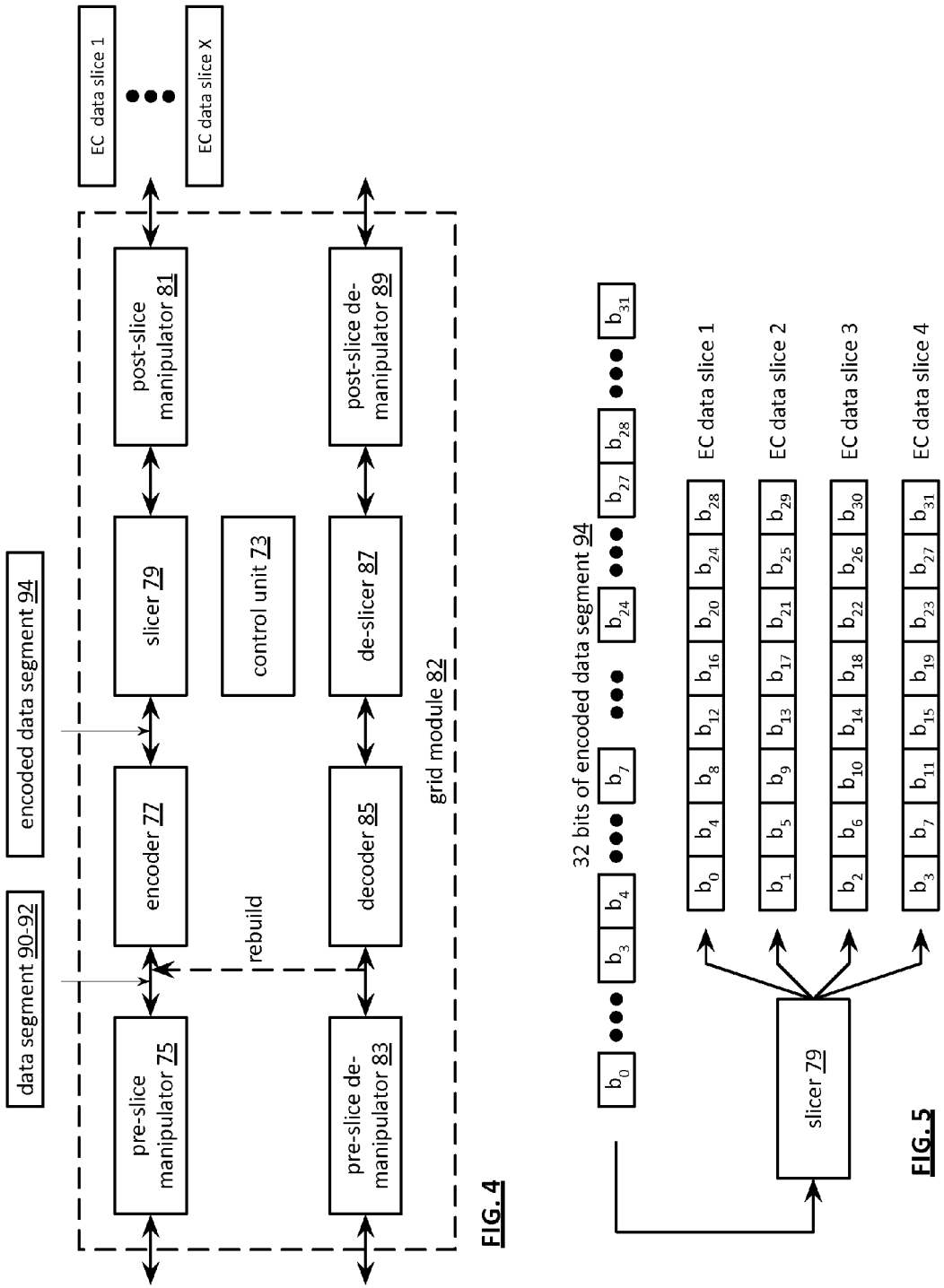

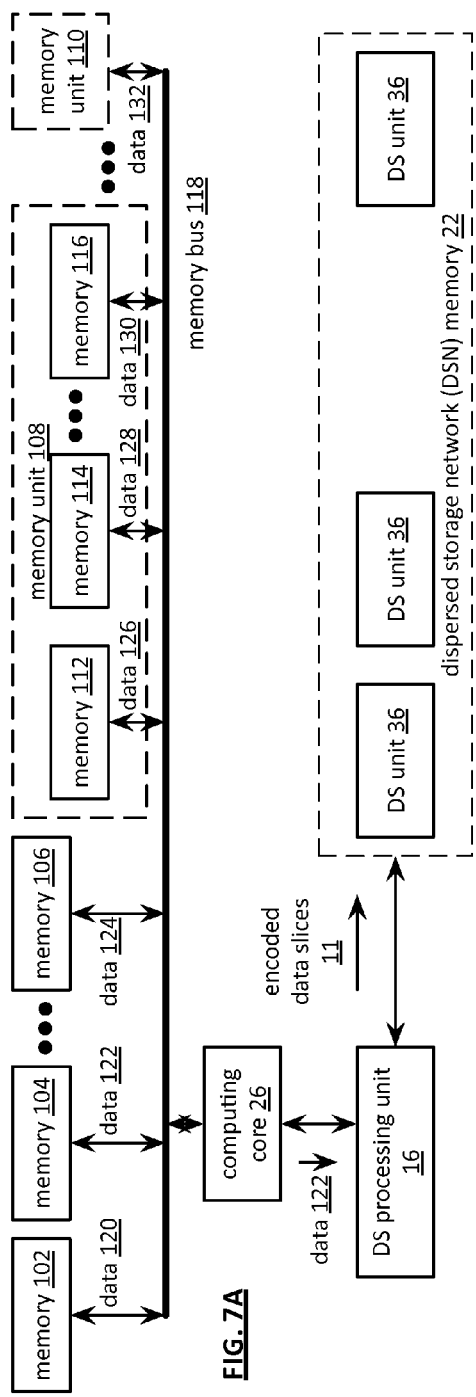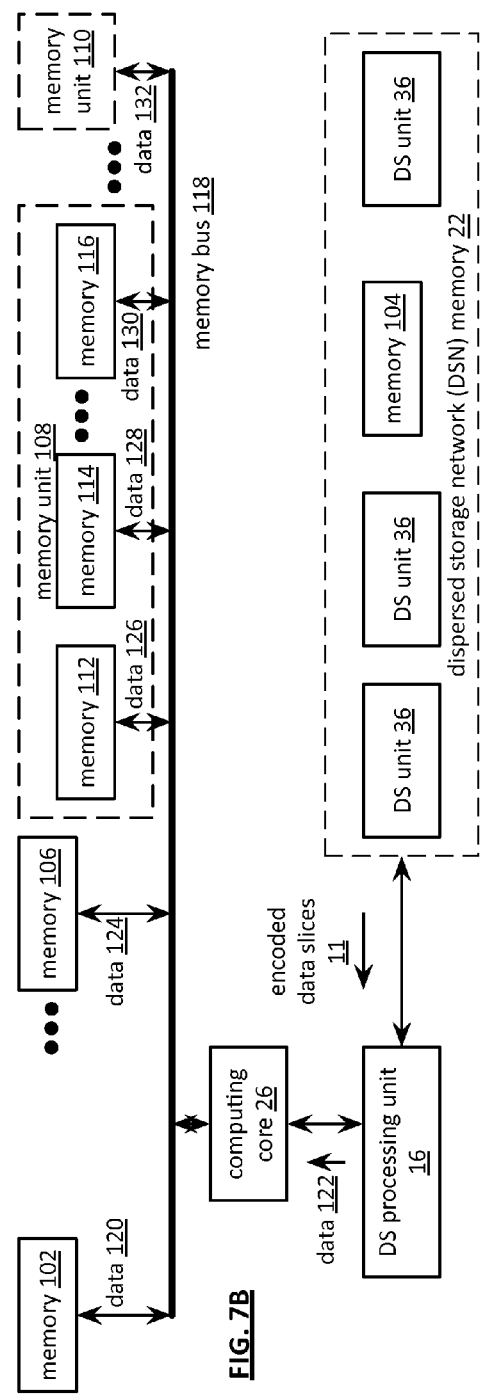

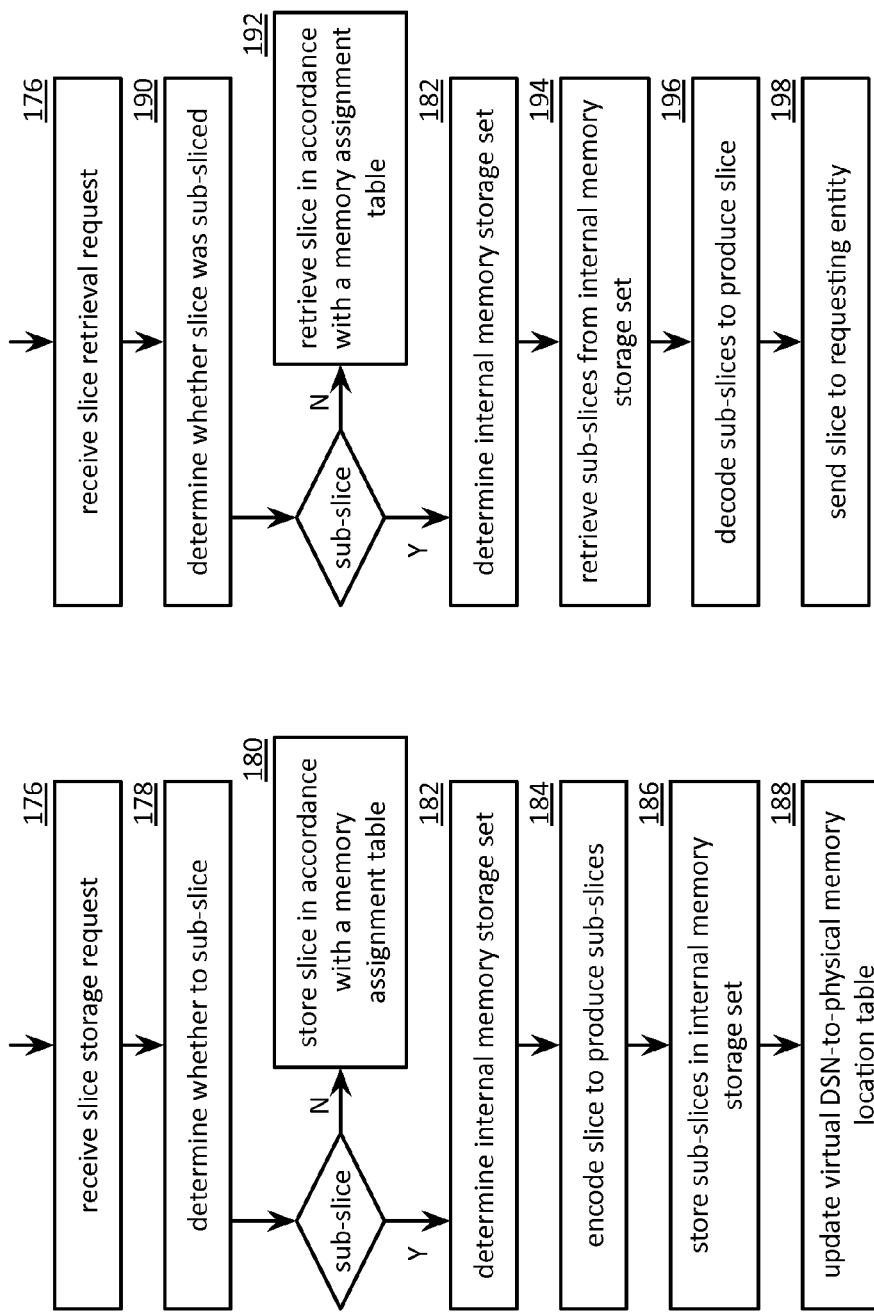

REPROVISIONING A MEMORY DEVICE INTO A DISPERSED STORAGE NETWORK MEMORY

CROSS REFERENCE TO RELATED PATENTS

The present U.S. Utility patent application claims priority pursuant to 35 U.S.C. §119(e) to U.S. Provisional Application Ser. No. 61/377,428, entitled "REPURPOSING MEMORY IN A DISPERSED STORAGE NETWORK," filed Aug. 26, 2010, pending, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 7A is a schematic block diagram of an embodiment of a hybrid computing system in accordance with the invention;

FIG. 7B is a schematic block diagram of another embodiment of a hybrid computing system in accordance with the invention;

FIG. 11A is a flowchart illustrating an example of storing an encoded data slice in accordance with the invention;

FIG. 11B is a flowchart illustrating an example of retrieving an encoded data slice in accordance with the invention;

DETAILED DESCRIPTION OF THE INVENTION

Figure 1:
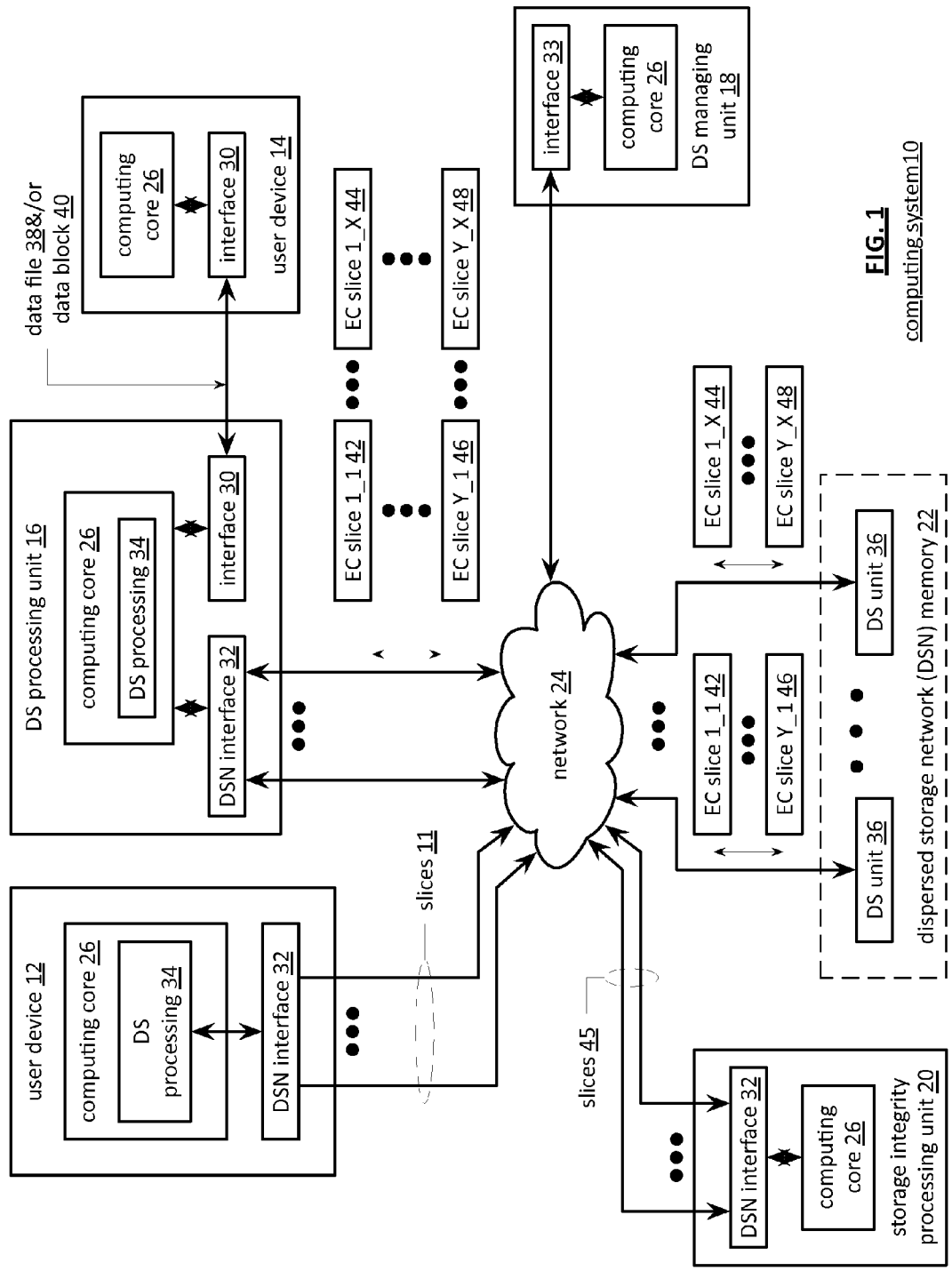
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-24.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-24.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
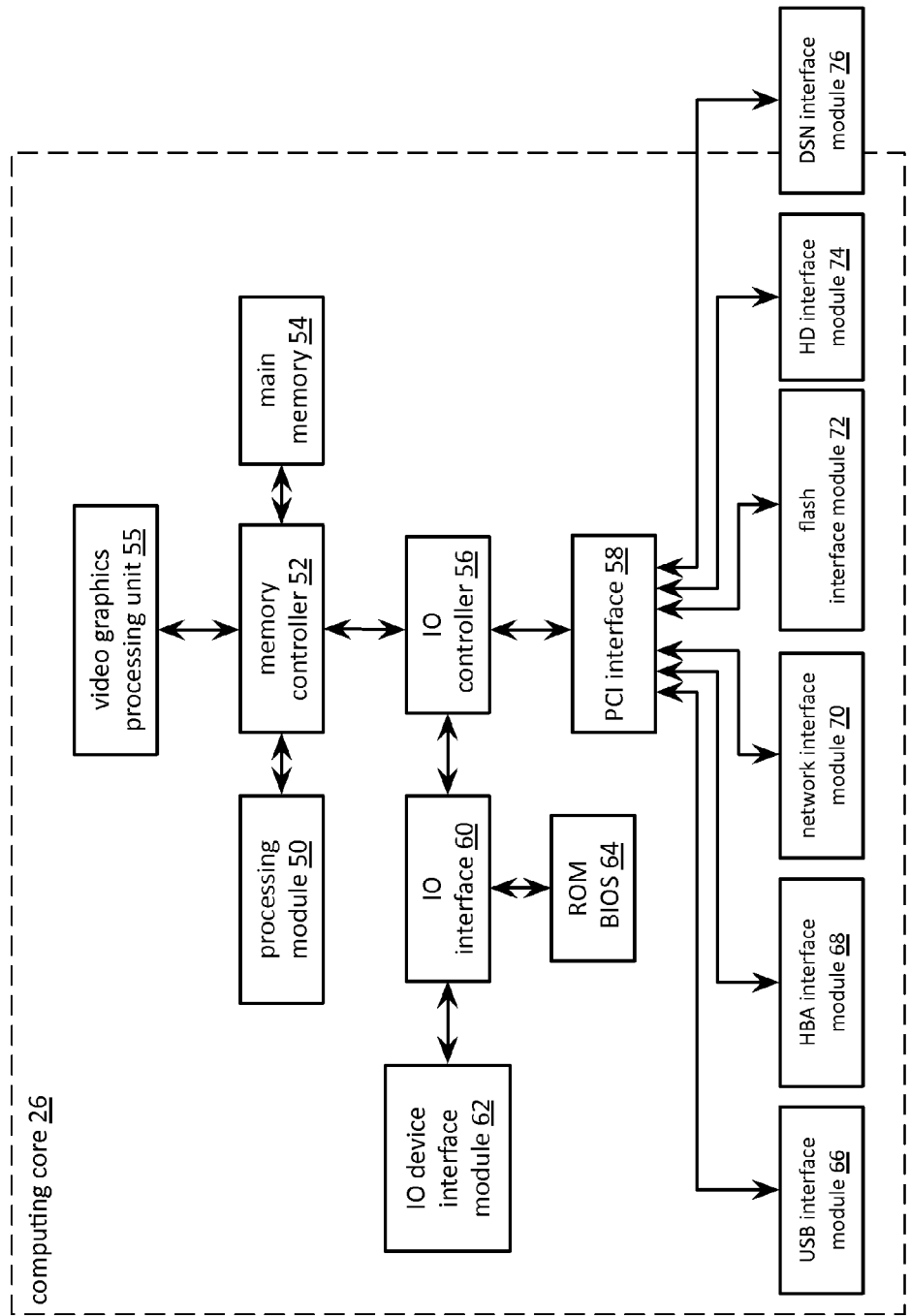
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-24.

Figure 3:
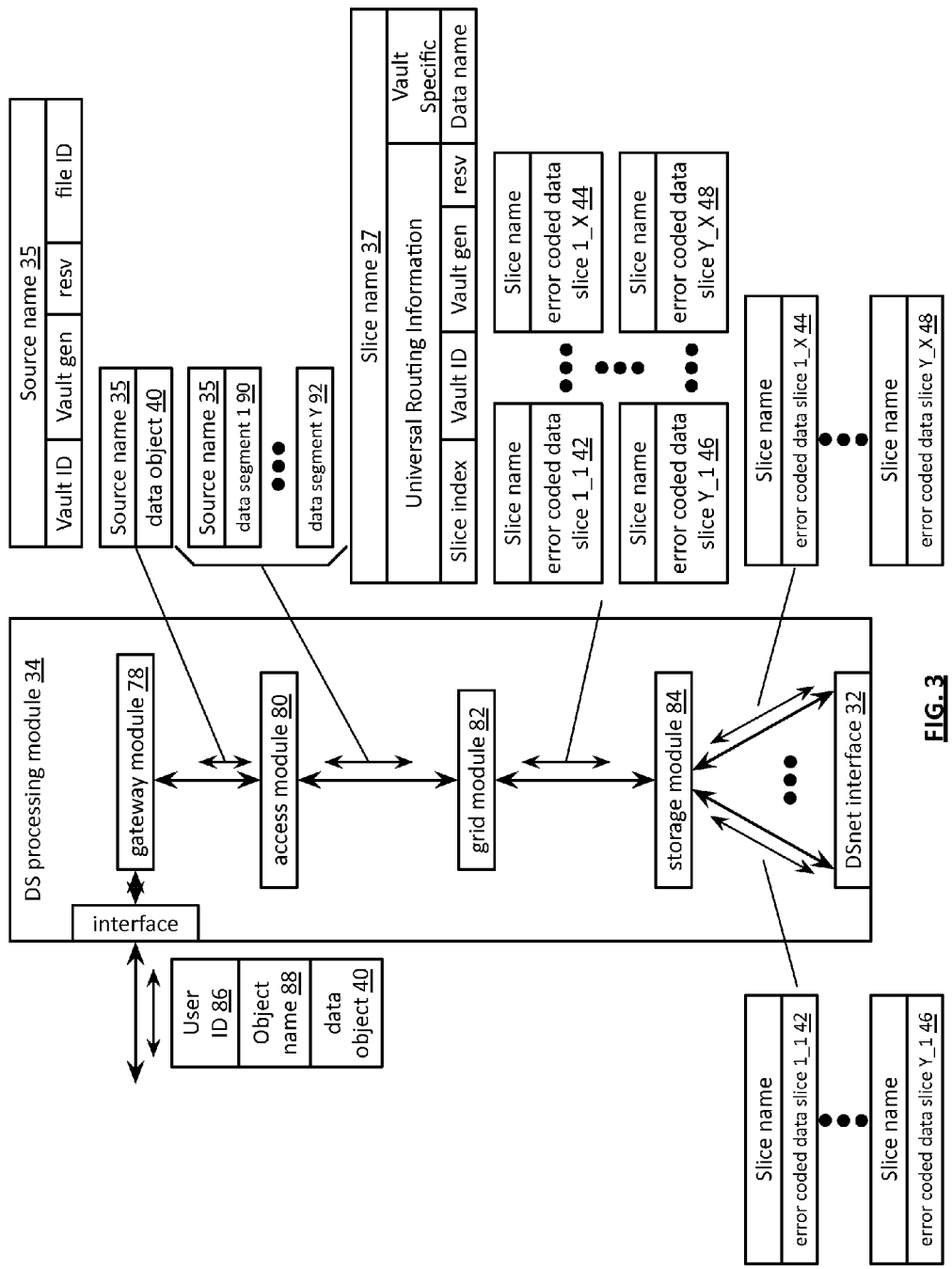
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131, 072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
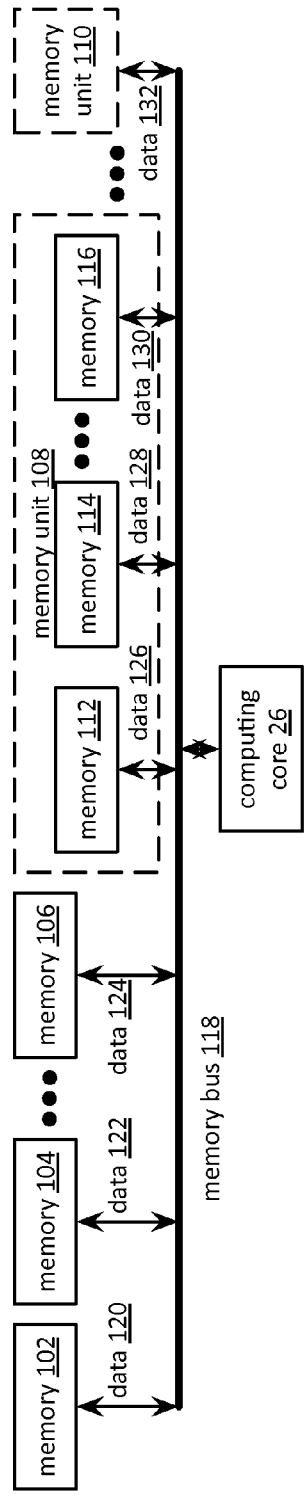
FIG. 6A is a schematic block diagram of an embodiment of a legacy computing system in accordance with the invention.

FIG. 6A is a schematic block diagram of an embodiment of a legacy computing system. The system includes a plurality of memories 102-106, a plurality of memory units 108-110, a memory bus 118, and a computing core 26. The memory units 108-110 may include a plurality of memories 112-116. The memories 102-106 and 112-116 may include one or more of a magnetic hard drives, a solid state memory, a tape drive, and optical memory, or any other type of memory technology to store and retrieve data. The memories 102-106 and 112-116 may have varying capacities. For example, memory 102 has a 500 gigabyte (GB) capacity, memory 104 as a 1 terabyte (TB) capacity, and memory 106 as a 2 TB capacity. The memories 102-106 and 110-116 may be implemented with different models of different manufacturers.

The memories 102-106 and 112-116 are operably coupled to the computing core 26 via the memory bus 118 to facilitate transfer of data 120-124 and data 126-132. For example, memory 104 communicates data 122 with the computing core 26. The computing core 26 may store replicated copies of the same data in two or more of the memories. For example, computing core 26 stores a first copy of data in memory 106 and a second copy of the data in memory 114. As another example, computing core 26 stores the first copy of data in memory 112 and a second copy of the data in memory 116 when the data is to be replicated within a single memory unit 108.

A typical memory of the memories 102-106 and 112-116 may fail from time to time as the memory ages beyond a usable memory life time period. Memory costs of the computing system include memory replacement costs and memory cost over the usable memory life. The memory cost over the usable memory life includes the memory cost divided by the usable memory life time period. Lowering the memory cost lowers the memory costs of the computing system. Extending the usable memory lifetime period lowers the memory costs of the computing system. Replacing the memory impacts cost of the legacy computing system based on a memory replacement cost and a memory disposal cost.

Figure 6B:
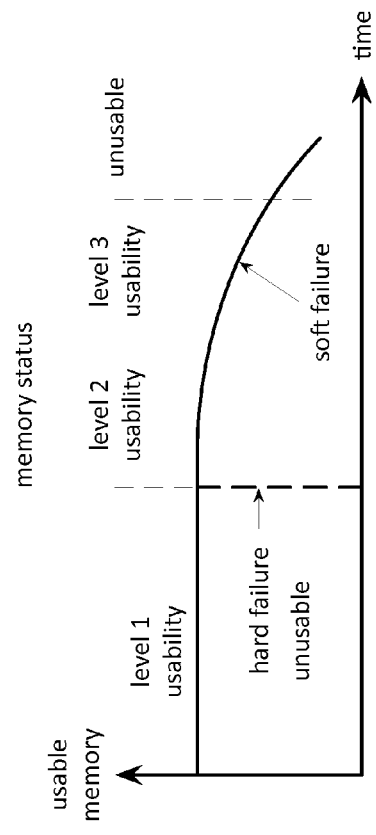
FIG. 6B is a graph illustrating an example of a memory status in accordance with the invention.

FIG. 6B is a graph illustrating an example of a memory status. The graph depicts usable memory (e.g., capacity) over time for a memory device (e.g., a magnetic hard disk drive). Usability is divided into four categories including a level 1 usability, a level 2 usability, a level 3 usability, and an unusable level. Note that a maximum amount of usable memory is available during the level 1 time period. A degradation of usable memory occurs over time as the memory device ages. For example, a hard failure abruptly changes the usable memory level from a usable level (e.g., level 1) to the unusable level. As another example, soft failures may gradually change the usable level from level 1 to level 2 to level 3 to the unusable level when the usable memory is below a threshold.

The memories 102-106 and 112-116 may be of different ages with respect to initial use such that some memories may fail sooner than other memories. Each memory may follow the memory status curve of the graph in different ways. Analyzing or predicting a memory status of a memory may provide an improvement in memory utilization by avoiding use of a memory that is not favorable for storing data based on an associated storage requirement of the data. A catastrophic loss of data may occur if only one copy of data is stored on a memory that follows the soft failure curve such that eventually the data is no longer retrievable. A catastrophic loss of data may not occur when one pillar of encoded data slices, produced using an error coding dispersal storage function, is stored on a memory that follows the soft failure curve such that eventually the pillars is no longer retrievable. In such a scenario, the data may still be retrievable when a threshold number of encoded data slices from other memories can be retrieved. A single memory failure may be much less likely to cause a catastrophic loss of data when the memory is utilized in a dispersed storage network. An improvement to the overall usable memory life may be provided by migrating a memory from a legacy memory system to a dispersed storage network. The method of migrating a memory from the legacy memory system to the dispersed storage network is discussed in greater detail with reference to FIGS. 7A-24.

FIGS. 7A-7B illustrates a memory migration scenario illustrating how data contained in a memory of a legacy computing system may be migrated to a dispersed storage network (DSN) and how the memory may be physically repurposed in the dispersed storage to store encoded data slices rather than data (e.g., whole data objects). A reliability and availability improvement of the data may be provided in such a migration scenario since the data is stored as encoded data slices and failure of the memory may not impact data availability. An improvement in the useful life of the memory may be provided in the migration scenario since a failure of a memory in the DSN may not impact data availability to the degree that a failure of the memory when utilized in the legacy computing system. The method of operation of migrating data and memories from a legacy computing system to a DSN is discussed in greater detail with reference to FIGS. 8-24.

FIG. 7A is a schematic block diagram of an embodiment of a hybrid computing system. The hybrid computing system includes a legacy computing system operably coupled to a dispersed storage network (DSN). The system includes a plurality of memories 102-106, a plurality of memory units 108-110, a memory bus 118, a computing core 26, a dispersed storage (DS) processing unit 16, and a DSN memory 22. As illustrated, the DSN memory 22 includes a plurality of DS units 36. Memory unit 108 includes a plurality of memories 112-116. The computing core 26 interoperates with the DS processing unit 16 as described below.

The DS processing unit 16 encodes data utilizing an error coding dispersal storage function to produce encoded data slices 11. The DS processing unit 16 outputs the encoded data slices 11 to the DSN memory 22 for storage. The DS processing unit 16 retrieves encoded data slices 11 from the DSN memory and decodes the encoded data slices 11 utilizing the error coding dispersal storage function to reproduce the data. In an example of operation, the computing core 26 retrieves data 122 from memory 104 when memory device 104 has an expired usable memory life with respect to a legacy storage protocol utilized by the legacy computing system. The computing core 26 sends the data 122 to the DS processing unit 16. The DS processing unit 16 encodes the data 122 utilizing the error coding dispersal storage function to produce encoded data slices of data 122. The DS processing unit 16 sends the encoded data slices 11 to the DSN memory 22 for storage in a plurality of DS units 36. Note that the computing core 26 may retrieve the data 122 either from memory 104 or from the DS processing unit 16. The computing core 26 retrieves the data 122 from the DS processing unit 16 when the memory 104 is removed from the legacy computing system. The method of retrieval of data 122 is discussed in greater detail with reference to FIG. 7B.

FIG. 7B is another schematic block diagram of another embodiment of a hybrid computing system. The hybrid computing system includes a legacy computing system and a dispersed storage network (DSN). The system includes a plurality of memories 102-106, a plurality of memory units 108-110, a memory bus 118, a computing core 26, a dispersed storage (DS) processing unit 16, and a DSN memory 22. The memory 104 is physically moved from the legacy computing system (e.g., disconnected from the memory bus 118 as shown in FIG. 7A) to the DSN when the memory 104 has an expired usable memory life and data 122 has been extracted from the memory 104. The memory 104 is utilized as a DS unit 36 as part of the DSN memory 22 when memory 104 is moved to the DSN. For example, the memory 104 receives encoded data slices for storage from the DS processing unit 16. As another example, the memory 104 outputs encoded data slices to the DS processing unit 16 in response to a retrieval request.

In an example of operation, the computing core 26 sends a retrieval request to the DS processing unit 16 for data 122. The DS processing unit 16 retrieves encoded data slices 11 from the DSN memory 22. The DS processing unit 16 decodes the encoded data slices 11 utilizing an error coding dispersal storage function to reproduce the data 122. The DS processing unit 16 outputs the data 122 to the computing core 26. In an instance, at least some of the encoded data slices 11 (e.g., of data 122) are stored within the memory 104. In another instance, none of the encoded data slices 11 (e.g., of data 122) are stored within the memory 104.

Figure 8:
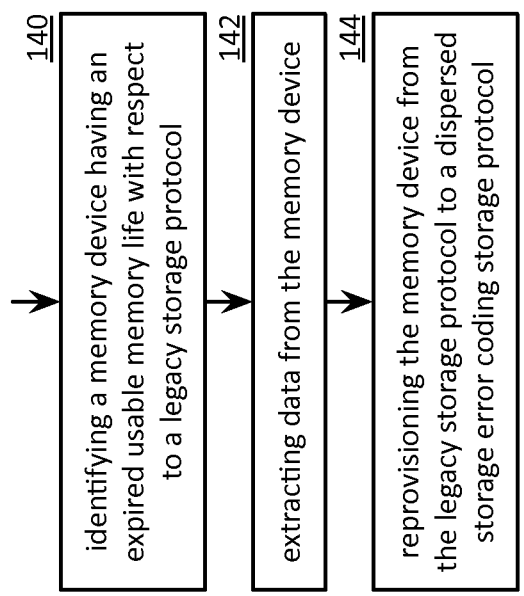
FIG. 8 is a flowchart illustrating an example of repurposing a legacy memory into a dispersed storage network in accordance with the invention.

FIG. 8 is a flowchart illustrating an example of repurposing a legacy memory into a dispersed storage network. The method begins with step 140 where a processing module (e.g., of a dispersed storage (DS) unit) identifies a memory device having an expired useable memory life with respect to a legacy storage protocol (e.g., redundant array of independent disks (RAID)). The identifying the memory device for reprovisioning prior to expiration of the useable memory life is based on at least one of a network management message, a memory device usable memory life age indicator, a usable memory life age threshold, a user input, an error message, a configuration message, a replacement schedule, an available memory message, a memory device insertion detector output, a message, and a command. For example, the processing module identifies the memory device for reprovisioning when the memory device usable memory life age indicator is 3 years and 1 day and a usable memory life age threshold associated with the memory device is 3 years.

The method continues at step 142 where the processing module extracts data from the memory device. Such extraction includes at least one of retrieving at least a portion of the data from the memory device, sending a data retrieval message to the memory device, sending a data retrieval message to a legacy computing system associated with the memory device, sending a data retrieval message to a DS unit associated with the memory device, and receiving the data from the memory device.

The method continues at step 144 where the processing module reprovisions the memory device from the legacy storage protocol to a dispersed storage error coding storage protocol. The reprovisioning the memory device includes one or more of integrating the memory device into a dispersed storage network (DSN) memory (e.g., detecting activation of the memory device in the DSN memory), establishing a local storage table that indicates a mapping of slice names to memory device addresses within the DSN memory, writing a plurality of zeros to the memory device, writing a plurality of ones to the memory device, writing a sequence of a plurality of zeros and ones to the memory device, writing random data to the memory device, and verifying that performance of the memory device within the DSN memory is in accordance with a dispersed storage error coding storage protocol (e.g., compare data written to data read, test portions of the memory device).

Alternatively, or in addition to, the reprovisioning the memory device further includes at least one of converting the data extracted from the memory device from the legacy storage protocol to the dispersed storage error coding storage protocol to produce dispersed storage error encoded data (e.g., slices) and storing at least a portion of the dispersed storage error encoded data in the DSN memory in accordance with the dispersed storage error coding storage protocol.

Alternatively, or in addition to, the reprovisioning the memory device further includes determining a memory device usability level of the memory device and reprovisioning the memory device into the DSN memory in accordance with the memory device usability level. The memory device usability level includes at least one of a data retrieval failure rate, a memory element failure (e.g., a bad disk sector), a mechanical disk operational issue, and a data write verification issue. For example, processing module reprovisions the memory device into the DSN memory by updating the local storage table to indicate a mapping of slice names associated with slices requiring a storage reliability level consistent with the memory device usability level to memory device addresses within the memory device.

Figures 9A, 9B:
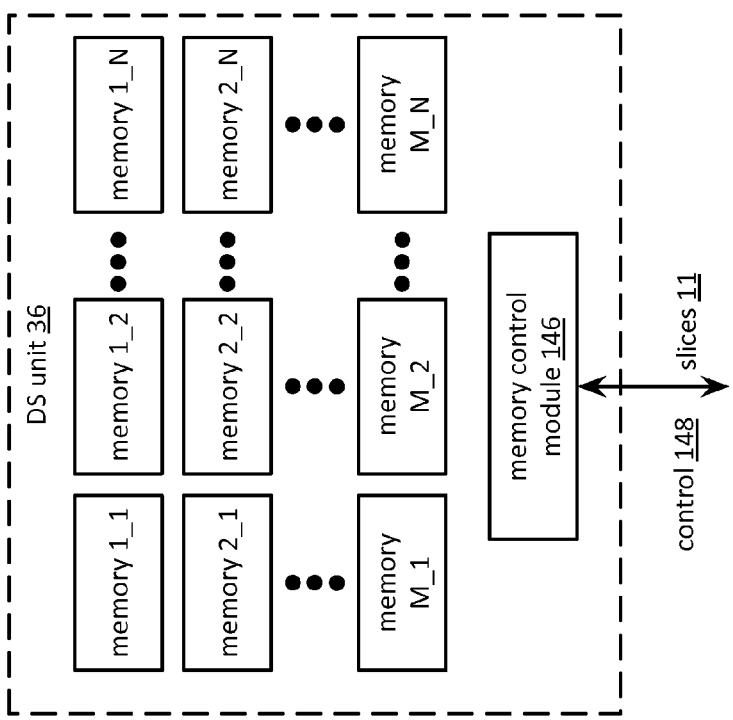
FIG. 9A is a schematic block diagram of an embodiment of a dispersed storage (DS) unit in accordance with the invention.
FIG. 9B is a table illustrating an example of a memory assignment table in accordance with the invention.

FIG. 9A is a schematic block diagram of an embodiment of a dispersed storage (DS) unit 36. The DS unit 36 includes a plurality of memories 1_1 to M_N, and a memory control module 146. The DS unit 36 may be implemented with any number of memories. The memories 1_1 to M_N may be physically repurposed to the DS unit from a legacy computing system. The memory control module 146 may be implemented utilizing a computing core 26. The memory control module 146 is operably coupled to each of the plurality of memories 1_1 to M_N. The memory control module 146 functions include one or more of controlling the memories, storing data, retrieving data, deleting data, listing data, configuring memories, allocating memories, determining status, storing metadata, storing encryption keys, storing memory device access information, and managing memories. The memory control module 146 interfaces to the network 24 to facilitate communication of control information 148 and slices 11 with a dispersed storage network (DSN).

In an example of operation, the memory control module 146 receives slices 11 via the network 24. The memory control module 146 selects one or more of the memories 1_1 to M_N to produce selected memories to store the slices 11 based on one or more of a vault identifier, a user identifier, a data identifier, a current allocation of memories to vaults, memory status, a memory age indicator, an error message, a memory performance history record, and a storage requirement. The memory control module 146 stores the slices in the selected memories.

As another example of operation, the memory control module 146 determines a memory status of a memory based on one or more of a query, a test, a performance record, an availability record, a reliability record, an error message, a memory age indicator, a usable memory life indicator, a set of usable memory life thresholds, a previous memory status, a message, a usable portion of the memory indicator, an unusable portion of the memory indicator, and a command. For instance, the memory control module 146 determines the memory status based on verifying operation via a test of one or more portions of the memory. The method of operation of the memory control module 146 is discussed in greater detail with reference to FIG. 9B-24.

FIG. 9B is a table illustrating an example of a memory assignment table 150. The memory assignment table 150 includes a memory identifier (ID) field 152, an allocation field 154, and a memory status field 156. The memory ID field 152 includes memory ID entries that list an identifier associated with a particular memory such that substantially all memories of a dispersed storage (DS) unit are listed within the memory assignment table 150 (e.g., memories 1_1 to M_N).

The allocation field 154 includes allocation entries that indicate whether a memory of an associated memory ID is unallocated for utilization or allocated for utilization to a vault of a dispersed storage network (DSN). For example, memories 1_1, 2_2, M_2, and M_N are unallocated, memory 1_2 is allocated to vault 320, memory 1_N is allocated to vault 59B, memories 2_1 and 2_N are allocated to vault 10A, and memory M_1 is allocated to vault 457. Two or more memories may be allocated to the same vault when the two or more memories are utilized to store slices of two or more pillars. Two or more memories may be allocated to the same vault when the two or more memories are utilized to store sub-slices of a slice received via the network 24.

The memory status field 156 includes memory status entries that indicate a memory status of an associated memory. For example, memory 1_1 has a level 3 memory status, memory 1_2 as a level 1 memory status, memory 1_N has a level 2 memory status, memory 2_1 has the level 1 memory status, memory 2_2 as an unusable memory status, memory 2_N has the level 2 memory status, memory M_1 as the level 1 memory status, memory M_2 as the unusable memory status, and memory M_N has the level 1 memory status.

Figure 10B:
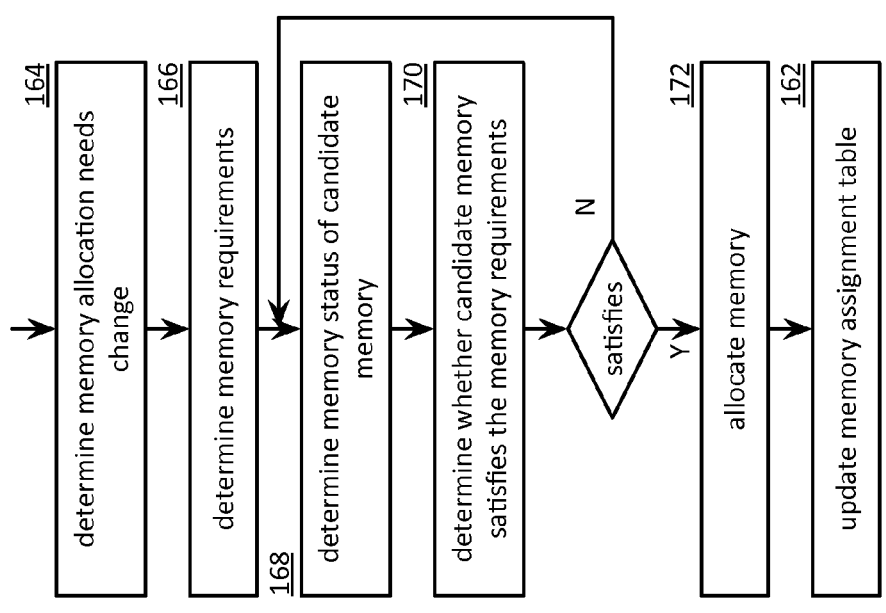
FIG. 10B is a flowchart illustrating an example of allocating memory in accordance with the invention.
Figure 10A:
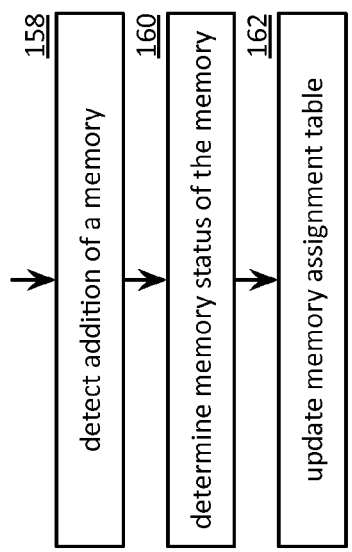
FIG. 10A is a flowchart illustrating an example of adding a memory in accordance with the invention.

FIG. 10A is a flowchart illustrating an example of adding a memory. The method begins with step 158 where a processing module (e.g., of a memory control module) detects addition of a memory. The detection may be based on one or more of a network management message, a query, a test, a user input, an error message, a configuration message, and available memory message, a memory card insertion detector output, a message, and a command. The method continues at step 160 where the processing module determines memory status of the memory (e.g., as discussed with reference to FIG. 9A). The method continues at step 162 where the processing module updates a memory assignment table to indicate the memory status for the corresponding memory.

FIG. 10B is a flowchart illustrating an example of allocating memory, which include similar steps to FIG. 10A. The method begins with step 164 where a processing module (e.g., a memory control module) determines a memory allocation needs change. The determination may be based on one or more of an error message, an error rate indicator, a comparison of the error rate indicator to an error rate threshold, a test, a query, a message, and a command. For example, the processing module determines that the memory allocation needs change when the error rate indicator is above the error rate threshold.

The method continues at step 166 where the processing module determines memory requirements (e.g., which memory status level is required). The determination may be based on one or more of a memory requirement indicator, a data type, stored data, a data frequency of access indicator, a previous memory status level, a message, and a command. For example, the processing module determines the memory requirements based on the previous memory status level. Alternatively, the current memory status level may have risen above the current memory status level. For example, the processing module determines the memory requirements as memory status level 2 when the previous memory status level is 2 and the current memory status level is 3.

The method continues at step 168 where the processing module determines a memory status of a candidate memory. The determination may be based on a lookup of a memory assignment table, a refresh query, a message, and a command. For example, the processing module determines the memory status of the candidate memory by reading a memory status field entry for the memory from the memory assignment table. The method continues at step 170 where the processing module determines whether the candidate memory satisfies the memory requirements based on comparing the two. For example, the processing module determines that the candidate memory satisfies the memory requirements when the memory status of the candidate memory is level 1 or 2 and the memory requirements is memory status level 2. As another example, the processing module determines that the candidate memory does not satisfy the memory requirements when the memory status of the candidate memory is level 3. The method continues to step 172 when the processing module determines that the candidate memory satisfies the memory requirements. The method repeats back to step 168 when the processing module determines that the candidate memory does not satisfy the memory requirements.

The method continues at step 172 where the processing module allocates the memory by assigning the memory to a vault (e.g., a vault in need of storage capacity) and configuring the memory. The method continues at step 162 of FIG. 10A where the processing module updates a memory assignment table (e.g., indicating which vault is assigned to the memory and the current memory status level).

FIG. 11A is a flowchart illustrating an example of storing an encoded data slice. The method begins with step 176 where a processing module (e.g., of a memory control module) receives a slice storage request. The request may include one or more of a slice, a slice name, a vault identifier, a source name, and storage requirements. The method continues at step 178 where the processing module determines whether to sub-slice the slice. The determination may be based on one or more of the slice, the slice name, the vault identifier, the source name, the storage requirements, a predetermination, a lookup, a message, a data type indicator, a command, a memory assignment table, and a comparison of the storage requirements to a memory status of a memory. For example, the processing module determines to not sub-slice the slice when storage requirements are exceeded by a memory status of a memory associated with the vault as indicated in the memory assignment table. The method branches to step 182 when the processing module determines to sub-slice the slice. The method continues to step 180 when the processing module determines not to sub-slice the slice. The method continues at step 180 where the processing module stores the slice in a memory associated with the vault as indicated by the memory assignment table.

The method continues at step 182 where the processing module determines an internal memory storage set when the processing module determines to sub-slice the slice. The internal memory storage set includes memories associated with a common dispersed (DS) unit. The determination may be based on one or more of the slice, the slice name, the vault identifier, the source name, the storage requirements, a predetermination, a data type indicator, a lookup, a message, a command, the memory assignment table, and a comparison of the storage requirements to a memory status of a memory. For example, the processing module determines the internal memory storage set to be a plurality of memories that have a memory status level that is favorable as compared to the storage requirements. Note that the memory status level of the plurality of memories may be less stringent than the storage requirements when storing the slice and just one memory. For instance, the processing module determines the internal memory storage set to be a plurality of memories, each of which has a memory status level of 3 when the storage requirements require a memory status level 2. Note that the requirements are substantially met based on the nature of the error coded dispersal storage function utilized to produce sub-slices from the slice to store in the plurality of memories.

The method continues at step 184 where the processing module encodes the slice utilizing the error coded dispersal storage function to produce sub-slices. The sub-slices include one or more sets of sub-slices. The method continues at step 186 where the processing module stores the sub-slices in the internal memory storage set. The method continues at step 188 where the processing module updates a local virtual-dispersed storage network (DSN)-to-physical-memory location table indicating which sub-slices (e.g., which pillars) are stored in which memories of the internal memory storage set.

FIG. 11B is a flowchart illustrating an example of retrieving an encoded data slice, which includes similar steps to FIG. 11A. The method begins with step 176 of FIG. 11A where a processing module (e.g., of a memory control module) receives a slice retrieval request from a requesting entity. The request may include one or more of a slice name, a vault identifier, a source name, and storage requirements. The method continues at step 190 where the processing module determines whether the slice was sub-sliced prior to being stored. The determination may be based on one or more of a lookup in a virtual-as per storage network (DSN)-to-physical-memory location table, a memory assignment table lookup, the vault identifier, the slice and, the source name, storage requirements, a message, and a command. For example, the processing module determines that the slice was sub-sliced when the virtual-DSN-to-physical-memory location table indicates memories of an internal memory storage set where sub-slices were previously stored for the slice. The method branches to step 182 of FIG. 11A when the processing module determines that the slice was sub-sliced. The method continues to step 192 when the processing module determines that the slice was not sub-sliced. The method continues at step 192 where the processing module retrieves the slice from a memory as indicated by a memory assignment table lookup (e.g., the memory associated with a vault associated with the slice).

The method continues at step 182 of FIG. 11A where the processing module determines the internal memory storage set when the processing module determines that the slice was sub-sliced. The method continues at step 194 where the processing module retrieves the sub-slices from the internal memory storage set. The method continues at step 196 where the processing module decodes the sub slices utilizing an error coded dispersal storage function to produce the slice. The method continues at step 198 where the processing module sends the slice to the requesting entity.

Figure 12:
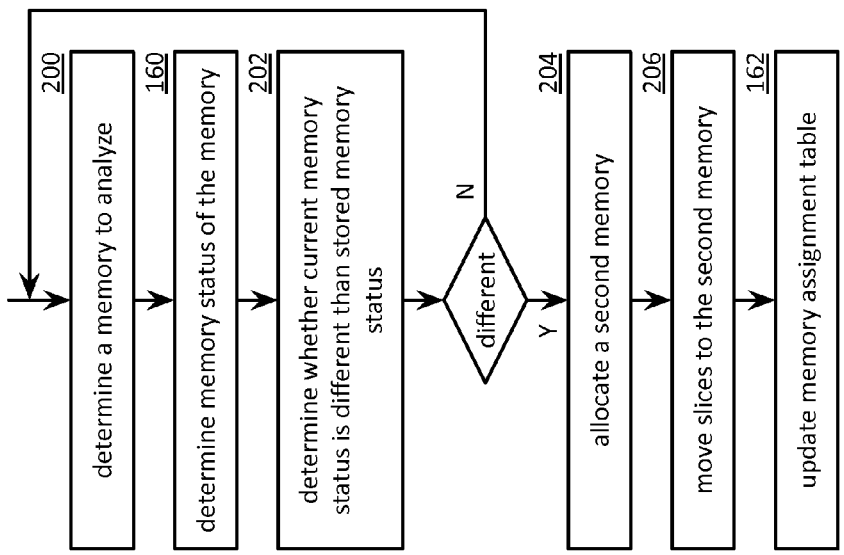
FIG. 12 is a flowchart illustrating another example of allocating memory in accordance with the invention.

FIG. 12 is a flowchart illustrating another example of allocating memory. The method begins with step 200 where a processing module (e.g., of a memory control module) determines a memory to analyze. The determination may be based on one or more of an error message, where an analysis process left off last time, a message, and a command. The method continues at step 160 of FIG. 10A where the processing module determines a current memory status for the memory.

The method continues at step 202 where the processing module determines whether the current memory status is different than a stored memory status (e.g., a previous memory status). For example, the processing module compares the current memory status to the stored memory status from a memory assignment table lookup. The method branches to step 204 when the processing module determines that the current memory status is different than the stored memory status. The method repeats back to step 200 when the processing module determines that the current memory status is not different than the stored memory status.

The method continues at step 204 where the processing module allocates a second memory by assigning one of a plurality of candidate memories (e.g., usable at a memory status level that meets the requirements set by the stored memory status) to be associated with a vault associated with the memory (e.g., a vault in need of a memory that meets the required memory status level). In addition, the processing module may configure the second memory.

The method continues at step 206 where the processing module moves slices from the memory to the second memory wherein the moving includes one or more of retrieving the slice from the memory and storing the slice in the second memory, retrieving the slice from the memory and storing sub-slices in the second memory produced from the slice, retrieving sub-slices from the memory and storing the sub-slices in the second memory, and retrieving sub-slices from the memory and storing re-encoded sub-slices in the second memory produced from the sub-slices. The method continues with step 162 of FIG. 10A for the processing module updates the memory assignment table indicating which vault is assigned to the memory and the current memory status level.

The method to determine an approach to move slices is discussed in greater detail with reference to FIG. 13.

Figure 13B:
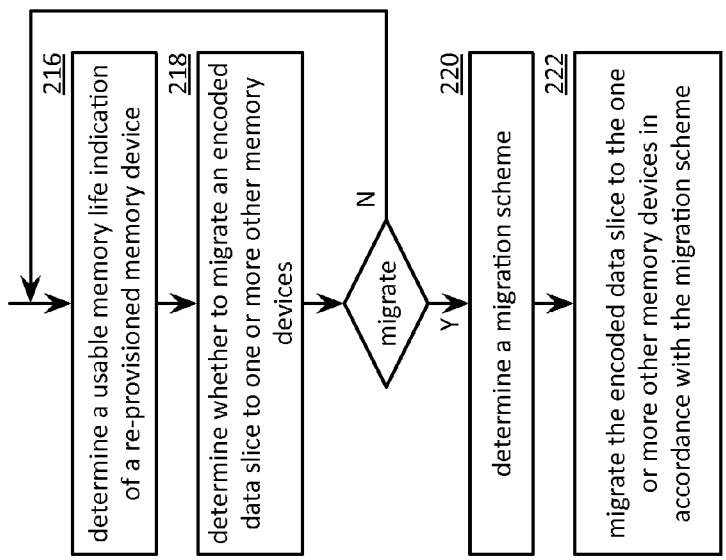
FIG. 13B is a flowchart illustrating an example of migrating an encoded data slice in accordance with the invention.
Figure 13A:
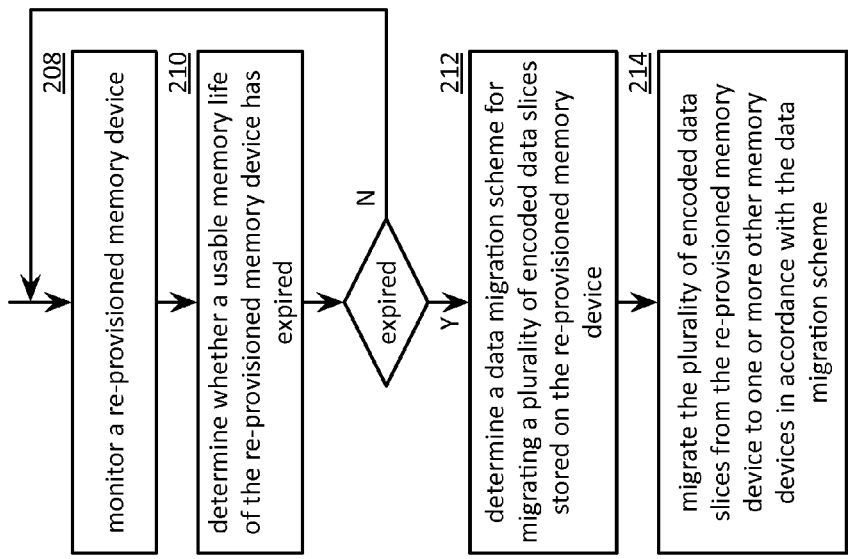
FIG. 13A is a flowchart illustrating an example of migrating a plurality of encoded data slices in accordance with the invention.

FIG. 13A is a flowchart illustrating an example of migrating a plurality of encoded data slices. The method begins with step 208 where a processing module (e.g., of a memory control module) monitors a reprovisioned memory device that has been reprovisioned from a legacy storage protocol to an error coding dispersed storage protocol. The method continues at step 210 where the processing module determines whether a usable memory life of the reprovisioned memory device in the error coding dispersed storage protocol has expired. The processing module determines the usable memory life by at least one of querying a memory usability level table, testing the reprovisioned memory device, determining a memory assignment, receiving an error message, retrieving an error message history, receiving a message, obtaining historical reliability data of similar reprovisioned memory devices, a reprovisioned memory device age, a reprovisioned memory type, a reprovisioned memory usage level, and receiving a command. The processing module determines whether the usable memory life has expired based on one or more of a network management message, a reprovisioned memory device usable memory life age indicator, a usable memory life age threshold, a user input, an error message, a configuration message, a replacement schedule, an available memory message, a memory device insertion detector output, a message, and a command. For example, the processing module determines that the usable memory life has expired when the reprovisioned memory device usable memory life age indicator is 4 years and 1 day and a usable memory life age threshold associated with the reprovisioned memory device is 4 years.

The method branches to step 212 when the processing module determines that the usable memory life of the reprovisioned memory device has expired. The method repeats back to step 208 when the processing module determines that the usable memory life of the reprovisioned memory device has not expired. The method continues at step 212 where the processing module determines a data migration scheme for migrating a plurality of encoded data slices stored on the reprovisioned memory device. The data migration scheme includes at least one of a data transfer scheme, sub-slicing data migration for an encoded data slice of the plurality of encoded data slices, pillar width expansion (e.g., generating one or more slices corresponding to one or more additional pillars while maintaining a constant decode threshold), and rebuilding an encoded data slice of the plurality of encoded data slices. The processing module determines the data migration scheme based on one or more of a usable memory life of each of one or more other memory devices, a storage requirement, querying a memory usability level table, testing at least one memory device of the one or more memory devices, determining a memory assignment, receiving an error message, retrieving an error message history, receiving a message, and receiving a command.

For example, the processing module determines the data migration scheme to be the data transfer scheme when at least one of the one or more other memory devices is associated with a usable memory life that compares favorably to the storage requirement. As another example, the processing module determines the data migration scheme to be sub-slicing data migration for the encoded data slice of the plurality of encoded data slices when none of the one or more other memory devices is associated with the usable memory life that compares favorably to the storage requirement. As yet another example, the processing module determines the data migration scheme to be rebuilding the encoded data slice when a encoded data slice error is detected (e.g., a calculated slice integrity indicator compares unfavorably to a recovered slice integrity indicator, a missing slice condition is detected). Alternatively, or in addition to, the processing module determines the data migration scheme by determining useful memory life indications of the one or more other devices and selecting the data migration scheme based on the useful memory life indications of the one or more other devices.

The method continues at step 214 where the processing module migrates the plurality of encoded data slices from the reprovisioned memory device to one or more other memory devices in accordance with the data migration scheme. For example, the processing module selects a memory device of the one or more other memory devices and transfers the plurality of encoded data slices to the memory device when the data migration scheme is the data transfer scheme. As another example, the processing module dispersed storage error encodes the encoded data slice to produce a set of encoded sub-slices, selects a set of memory devices of the one or more other memory devices, and sends the set of encoded sub-slices to the set of memory devices when the data migration scheme is the sub-slicing data migration for the encoded data slice of the plurality of encoded data slices. As yet another example, the processing module retrieves at least a decode threshold number of encoded data slices associated with the encoded data slice, reconstructs a data segment from the decode threshold number of encoded data slices, dispersed storage error encodes the data segment to produce a set of rebuilt encoded data slices, selects a rebuilt encoded data slice of the set of rebuilt encoded data slices, selects a memory device of the one or more other memory devices, and sends the rebuilt encoded data slice to the memory device when the data migration scheme is the rebuilding the encoded data slice of the plurality of encoded data slices.

Alternatively, or in addition to, the processing module migrates the plurality of encoded data slices further by determining storage requirements for the plurality of encoded data slices, determining that the one or more other memory devices satisfies the storage requirements, and when the one or more other memory devices satisfies the storage requirements, enabling the migrating of the plurality of encoded data slices from the reprovisioned memory device to the one or more other memory devices.

FIG. 13B is a flowchart illustrating an example of migrating an encoded data slice. The method begins with step 216 where a processing module (e.g., of a memory control module) determines a usable memory life indication of a reprovisioned memory device operable in accordance with an error coding dispersed storage protocol, wherein the reprovisioned memory device has been reprovisioned from a legacy storage protocol to the error coding dispersed storage protocol. The processing module determines the usable memory life indication by at least one of querying a memory usability level table regarding a portion of the reprovisioned memory device storing the encoded data slice, testing the portion of the reprovisioned memory device, determining a memory assignment regarding the portion, receiving an error message regarding the portion, retrieving an error message history regarding the portion, receiving a message regarding the portion, and receiving a command regarding the portion. For example, processing module determines the usable memory life indication by retrieving the error message history regarding the portion by obtaining historical reliability data of similar reprovisioned memory devices, memory usage levels, and memory age.

The method continues at step 218 where the processing module determines whether to migrate an encoded data slice of a plurality of encoded data slices to one or more other memory devices based on the usable memory life indication. For example, the processing module determines to migrate the encoded data slice when the usable memory life indication compares unfavorably to a storage requirement associated with the encoded data slice. The method branches to step 220 when the processing module determines to migrate the encoded data slice. The method repeats back to step 216 when the processing module determines not to migrate the encoded data slice.

The method continues at step 220 where the processing module determines a migration scheme. The migration scheme includes at least one of a data transfer scheme, sub-slicing data migration, pillar width expansion (e.g., generating one or more slices corresponding to one or more additional pillars while maintaining a constant decode threshold), and rebuilding the encoded data slice. The processing module determines the migration scheme based on one or more of a usable memory life of each of one or more other memory devices, a storage requirement, querying a memory usability level table, testing at least one memory device of the one or more memory devices, determining a memory assignment, receiving an error message, retrieving an error message history, receiving a message, and receiving a command.

For example, the processing module determines the migration scheme to be the data transfer scheme when at least one of the one or more other memory devices is associated with a usable memory life that compares favorably to the storage requirement. As another example, the processing module determines the migration scheme to be sub-slicing data migration for the encoded data slice when none of the one or more other memory devices is associated with the usable memory life that compares favorably to the storage requirement. As yet another example, the processing module determines the migration scheme to be rebuilding the encoded data slice when an encoded data slice error is detected.

The method continues at step 222 where the processing module migrates the encoded data slice to the one or more other memory devices in accordance with the migration scheme. For example, the processing module selects a memory device of the one or more other memory devices and transfers the encoded data slice to the memory device when the migration scheme is the data transfer scheme. As another example, the processing module dispersed storage error encodes the encoded data slice to produce a set of encoded sub-slices, selects a set of memory devices of the one or more other memory devices, and sends the set of encoded sub-slices to the set of memory devices when the migration scheme is the sub-slicing data migration. As yet another example, the processing module retrieves at least a decode threshold number of encoded data slices associated with the encoded data slice, reconstructs a data segment from the decode threshold number of encoded data slices, dispersed storage error encodes the data segment to produce a set of rebuilt encoded data slices, selects a rebuilt encoded data slice of the set of rebuilt encoded data slices, selects a memory device of the one or more other memory devices, and sends the rebuilt encoded data slice to the memory device when the migration scheme is the rebuilding the encoded data slice.

Figure 14:
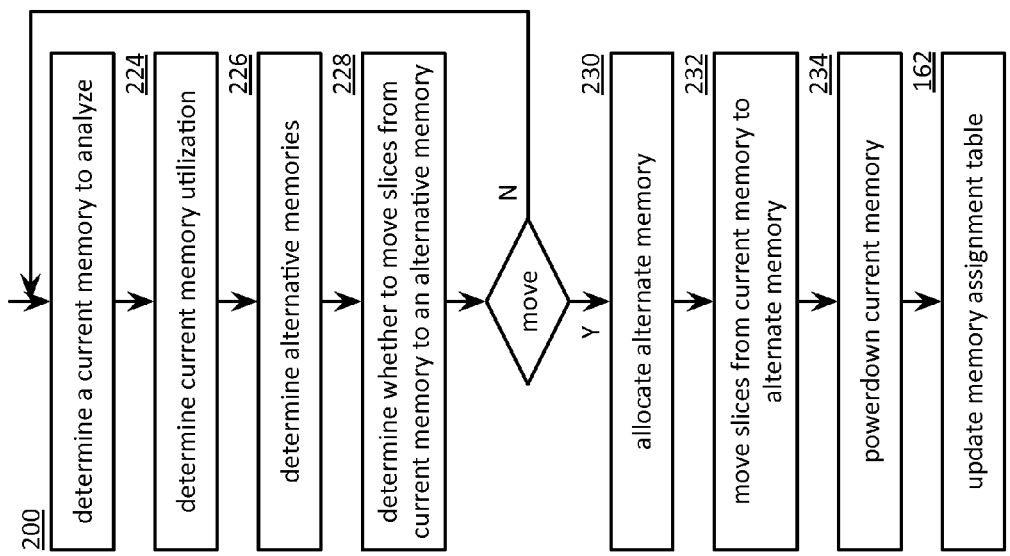
FIG. 14 is a flowchart illustrating another example of allocating memory in accordance with the invention.

FIG. 14 is a flowchart illustrating another example of allocating memory, which include similar steps to FIGS. 10A and 12. The method begins with step 200 of FIG. 12 where a processing module (e.g., of a memory control module) determines a current memory to analyze. The method continues at step 224 where the processing module determines a current memory utilization for the memory. The determination may be based on one or more of a memory status table, a test, a memory capacity indicator, a memory use indicator, a memory assignment table, a memory query, an error message, an error message history, a message, and a command. For example, the processing module determines the current memory utilization by a memory status table lookup.

The method continues at step 226 where the processing module determines alternative memories that have a memory status that substantially meets storage requirements of the memory. The determination may be based on one or more of a memory assignment table, a memory status level of the current memory, a memory status level of a candidate alternative memory, a comparison of the memory status level of the candidate alternative memory to the memory status level of the current memory, a predetermination, a lookup, a message, and a command. For example, the processing module determines that candidate alternative memory 2_1 has memory status level 1 and the current memory 1_2 as a memory status level 1.

The method continues at step 228 where the processing module determines whether to move slices from the current memory to an alternative memory of the alternative memories. The determination may be based on one or more of the alternative memories, the current memory utilization, an available memory indicator of the candidate memory, a predetermination, and lookup, a message, and a command. For example, the processing module determines to move the slices from the current memory to the alternative memory when the available memory indicator of the candidate memory indicates that sufficient memory is available to store the amount of currently stored slices as indicated by the current memory utilization. The method branches to step 230 when the processing module determines to move slices from the current memory to the alternative memory. The method repeats back to step 200 of FIG. 12 when the processing module determines not to move slices from the current memory to an alternative memory.

The method continues at step 230 where the processing module allocates the candidate alternate memory by assigning the alternate memory to be associated with a vault associated with the current memory. In addition, the processing module may configure the alternate memory as previously discussed. The method continues at step 232 where the processing module moves slices from the current memory to the alternate memory, wherein the moving may include one or more of retrieving the slice from the current memory and storing the slice in the alternate memory, retrieving the slice from the current memory and storing sub-slices in the ultimate memory produced from the slice, retrieving sub-slices from the current memory and storing the sub-slices in the alternate memory, and retrieving sub-slices from the current memory and storing re-encoded sub-slices in the alternate memory produced from the sub-slices. The method continues at step 234 where the processing module powers down the current memory to save power since it is not required. The method continues at step 162 of FIG. 10A where the processing module updates a memory assignment table indicating which vault is assigned to the alternate memory and that the current memory status is powered down.

Figure 15:
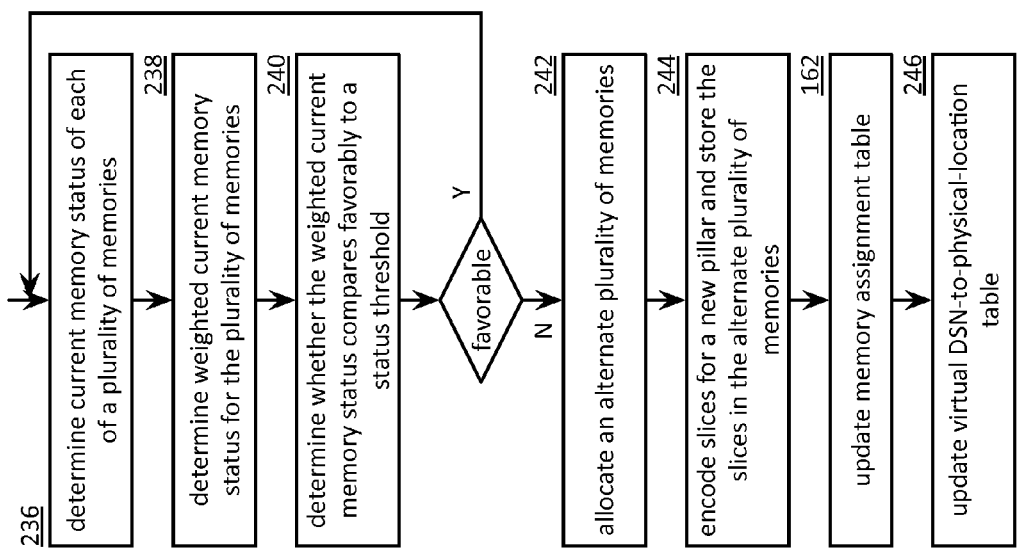
FIG. 15 is a flowchart illustrating another example of allocating memory in accordance with the invention.

FIG. 15 is a flowchart illustrating another example of allocating memory, which includes similar steps to FIG. 10A. The method begins with step 236 where a processing module (e.g., of a memory control module) determines a current memory status of each of a plurality of memories, wherein the determination of the memory status is as previously discussed (e.g., a lookup in a memory assignment table, a test, a query, etc.). The method continues at step 238 where the processing module determines a weighted current memory status for the plurality of memories. For example, the processing module determines the weighted current memory status by calculating an average memory status level for the aggregate of the plurality of memories. As another example, the processing module determines the weighted current memory status by multiplying each memory status level by an associated weighting factor to produce weighted memory status levels and then averaging the weighted memory status levels to produce the weighted current memory status.

The method continues at step 240 where the processing module determines whether the weighted current memory status compares favorably to a status threshold. For example, the processing module determines that the weighted current memory status compares favorably to the status threshold when the weighted current memory status is less than the status threshold. The method branches to step 242 when the processing module determines that the weighted current memory status does not compare favorably to the status threshold. The method repeats back to step 236 when the processing module determines that the weighted current memory status compares favorably to the status threshold.

The method continues at step 242 where the processing module allocates an alternative plurality of memories. For example, the processing module allocates the alternative plurality of memories when the alternative plurality of memories is idle (e.g., not allocated to a vault). Such an allocation has been previously discussed.

The method continues at step 244 where the processing module establishes an additional pillar in an error coding dispersal storage function utilized to encode data into slices. For example, processing module adds a 17th pillar to the error coding dispersal storage function that was previously utilizing 16 pillars. The processing module retrieves a decode threshold number of slices from other dispersal storage (DS) units, decodes the decode threshold number of slices to produce data, encodes the data utilizing the error coding dispersal storage function with the additional pillar to produce new slices including slices of the additional pillar. The processing module stores the slices of the additional pillar in the alternate plurality of memories. Note that the data may be recovered by retrieving a decode threshold number of slices including slices from the current memory and slices from the alternate memory. The method continues with step 162 of FIG. 10A where the processing module updates a memory assignment table indicating which memories are associated with which vaults and which memories may remain un-allocated. The method continues at step 246 where the processing module updates a virtual disperse towards network (DSN) to physical location table to map the alternate plurality of memories of a DS unit to new pillars of every vault.

Figure 16:
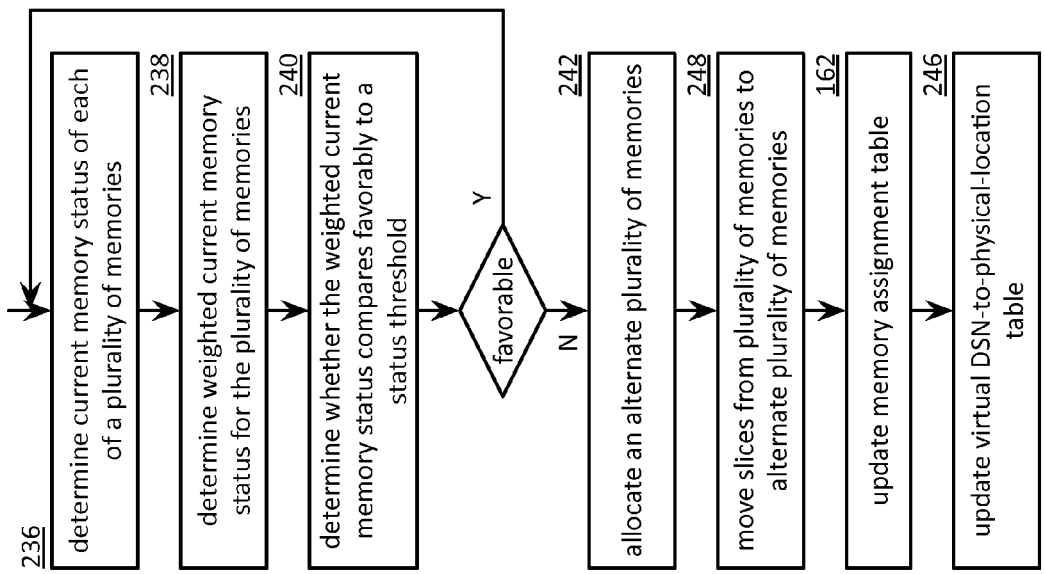
FIG. 16 is a flowchart illustrating another example of allocating memory in accordance with the invention.

FIG. 16 is a flowchart illustrating another example of allocating memory, which includes similar steps to FIGS. 10A and 15. The method begins with steps 236-242 of FIG. 15 where a processing module (e.g., of a memory control module) determines a current memory status of each of a plurality of memories, determines a weighted current memory status for the plurality of memories, determines whether the weighted current memory status compares favorably to a status threshold, and allocates an alternate plurality of memories when the processing module determines that the weighted current memory status compares unfavorably to the status threshold.

The method continues at step 248 where the processing module move slices from the plurality of memories to an alternate plurality of memories. For example, the processing module moves the slices directly by retrieving the slices from the plurality of memories and storing the slices in the alternate plurality of memories. As another example, the processing module moves the slices indirectly by retrieving the slices from the plurality of memories, temporarily storing the slices in a temporary memory, retrieving the slices from the temporary memory, and storing slices in the alternate plurality of memories. The method continues with step 162 of FIG. 10A where the processing module updates a memory assignment table. The method continues with step 246 of FIG. 15 where the processing module updates a virtual dispersed storage network (DSN) to physical location table.

Figure 17:
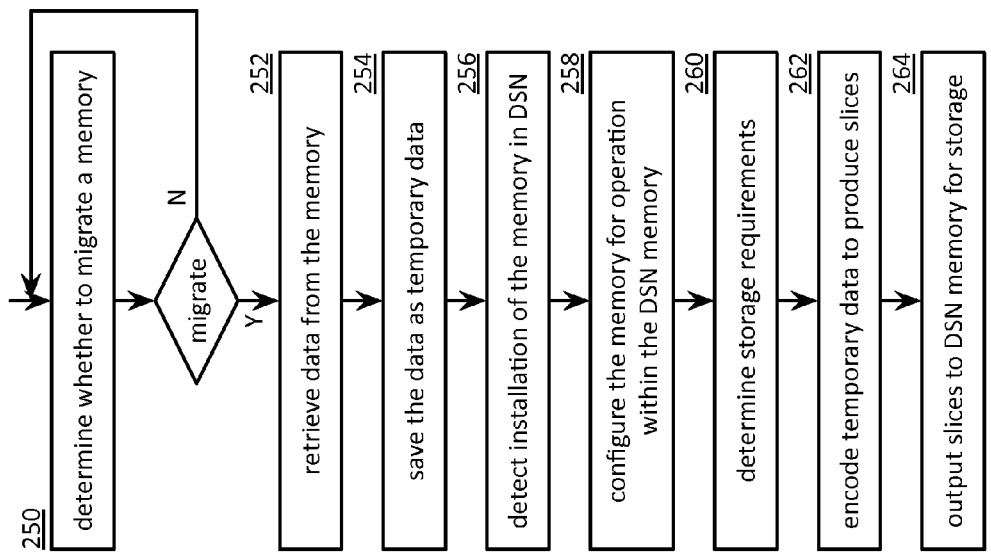
FIG. 17 is a flowchart illustrating an example of migrating a memory in accordance with the invention.

FIG. 17 is a flowchart illustrating an example of migrating a memory. The method begins with step 250 where a processing module (e.g., of a memory control module) determines whether to migrate a memory. The determination may be based on one or more of comparing a memory status to a migration threshold, a migration profile, a lookup, a predetermination, a schedule, a query, a message, and a command. For example, the processing module determines to migrate the memory when the memory status is above the migration threshold. As another example, the processing module determines to migrate the memory when a schedule indicates that it is time to migrate the memory (e.g., a magnetic hard disk drive memory is 37 months old). The method branches to step 252 when the processing module determines to migrate the memory. The method repeats back to step 250 when the processing module determines not to migrate the memory.

The method continues at step 252 where the processing module retrieves data from the memory. The method continues at step 254 where the processing module saves the data as temporary data (e.g., as data in a temporary memory and/or as encoded data slices in a dispersed storage network memory). The method continues at step 256 where the processing module detects installation of the memory in a dispersed storage network (DSN) memory. For example, the memory is physically moved from a legacy computing system to the DSN memory. As another example, the memory is physically moved from another DSN memory to the DSN memory. The detection may be based on one or more of reading data from the memory and comparing the data to the temporary data, a network management message, a user input, an error message, a configuration message, an available memory message, a memory card insertion detector output, a message, and a command.

The method continues at step 258 where the processing module configures the memory for operation within the DSN memory. For example, the processing module configures the memory by writing zeros to the memory. As another example, the processing module configures the memory by writing ones to the memory. As yet another example, the processing module configures the memory by writing random data to the memory. The processing module may perform several such cycles of writing data to the memory to complete the configuration step. The processing module may determine the memory status of the memory including the determination of usable portions (e.g., operational magnetic hard disk drive sectors) and unusable portions of the memory. The processing module utilizes the memory to store subsequent encoded data slices in the memory.

The method continues at step 260 where the processing module determines storage requirements. The determination may be based on one or more of the temporary data, a data size indicator, a security indicator, a performance indicator, an availability indicator, a lookup, a message, and a command. The method continues at step 262 where the processing module encodes the temporary data utilizing an error coding dispersal storage function to produce a plurality of sets of encoded data slices. The method continues at step 264 where the processing module outputs the plurality of sets of encoded data slices to a dispersed storage network (DSN) memory for storage therein. At least some of the encoded data slices may be stored in the memory.

Figure 18:
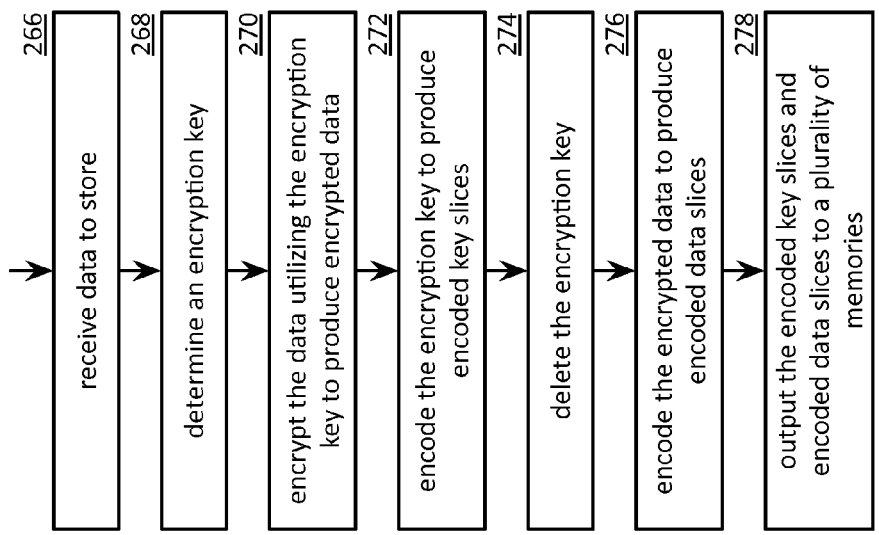
FIG. 18 is a flowchart illustrating an example of securely storing data in accordance with the invention.

FIG. 18 is a flowchart illustrating an example of securely storing data. The method begins at step 266 where a processing module (e.g., of a memory control module) receives data to store. The data may include one or more of a data object, a data segment, and one or more data slices. The method continues at step 268 where the processing module determines an encryption key. The determination may be based on one or more of an output of a random number generator, a lookup, a predetermination, a message, a received key, and a command. The method continues at step 270 where the processing module encrypts the data utilizing the encryption key and in accordance with an encryption function to produce encrypted data. The method continues at step 272 where the processing module encodes the encryption key utilizing an error coding dispersal storage function to produce encoded key slices. The method continues at step 274 where the processing module deletes the encryption key.

The method continues at step 276 where the processing module encodes the encrypted data utilizing the error coding dispersal storage function to produce encoded data slices. Alternatively, the processing module may determine not to encode the encrypted data based on one or more of a security requirement, a memory availability indicator, a lookup, a message, and a command. For example, the processing module determines not to encode the encrypted data when a memory availability indicator is below an availability threshold. The method continues at step 278 where the processing module outputs the encoded key slices and the encoded data slices to a plurality of memories for storage therein. For example, the slices are stored in memories wherein the memories are within a common dispersed storage (DS) unit. The processing module outputs the encrypted data to the plurality of memories when the processing module determines not to encode the encrypted data as previously discussed. The processing module stores memory locations of where the encoded key slices and the encoded data slices are stored.

In a retrieval example of operation, the processing module retrieves the encoded key slices and decodes the encoded key slices in accordance with the error coding dispersal storage function to produce the encryption key. The processing module retrieves the encoded data slices and decodes the encoded data slices in accordance with the error coding dispersal storage function to produce the encrypted data. Next, the processing module decrypts the encrypted data utilizing the encryption key and in accordance with a decryption function to reproduce the data.

Figure 19:
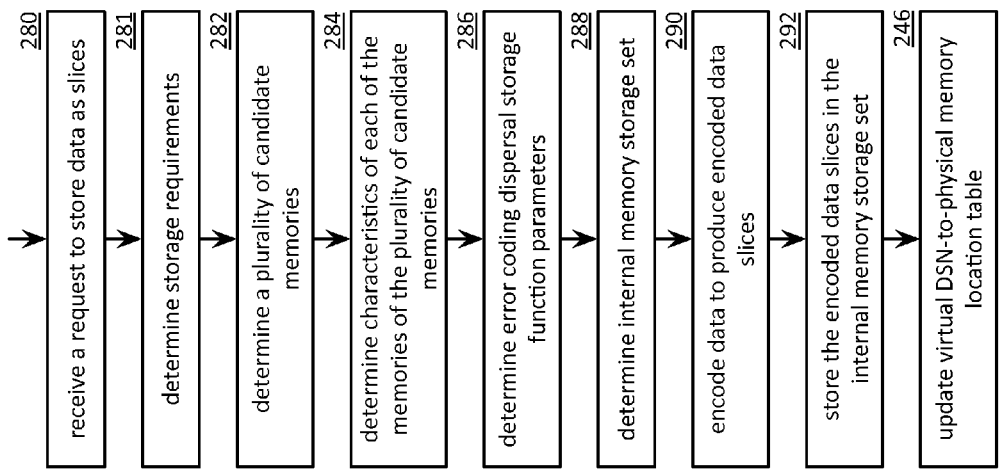
FIG. 19 is a flowchart illustrating an example of storing data in accordance with the invention.

FIG. 19 is a flowchart illustrating an example of storing data, which includes similar steps to FIG. 17. The method begins with step 280 where a processing module (e.g., of a memory control module) receives a request to store data as slices. The request may include one or more of a storage request, data, a slice, a slice name, a source name, a vault identifier (ID), and storage requirements. The processing module may receive the data by receiving the data (e.g. via a network interface) or by retrieving the data from a memory (e.g., a memory within a dispersed storage (DS) unit). The method continues at step 281 where the processing module determines storage requirements. The storage requirements may include one or more requirements of performance, reliability, availability, security, duration storage, estimated retrieval frequency, and class (e.g., enterprise, desktop, near-line). The determination may be based on one or more of the data, a data type, a reliability indicator, a security indicator, an estimated retrieval frequency indicator, a class of storage indicator, a lookup, a request, a query, a predetermination, and a command.

The method continues at step 282 where the processing module determines a plurality of candidate memories. The determination may be based on one or more of a memory assignment table, a query, a lookup, a predetermination, the data, a data identifier, a vault ID, and a command. The method continues at step 284 where the processing module determines characteristics of each of the memories of the plurality of candidate memories, wherein the characteristics includes one or more of error history, sector errors, catastrophic failure history, speed, capability, utilization, available memory, age, number of bad memory blocks, unassigned sectors, spare sectors, a disk drive model, a disk drive manufacturer, and a class. The determination may be based on one or more of a memory assignment table, a lookup, a query, a test, a message, and a command. For example, the processing module determines that a memory of the plurality of candidate memories has bad memory blocks in 50% of the memory based on a test.

The method continues at step 286 where the processing module determines error coding dispersal storage function parameters. The determination may be based on one or more of the storage requirements, the characteristics of each of the memories of the plurality of candidate memories, the candidate memories, a reliability policy, an error message, a lookup, a predetermination, a message, and a command. The method continues at step 288 where the processing module determines an internal memory storage set. The determination may be based on one or more of the storage requirements, the characteristics, the candidate memories, the error coding dispersal storage function parameters, and availability of the candidate memories.

The method continues at step 290 where the processing module encodes the data utilizing an error coding dispersal storage function in accordance with the error coding dispersal storage function parameters to produce encoded data slices. The method continues at step 292 where the processing module stores the encoded data slices in the internal memory storage set. The method continues at step 246 of FIG. 15 where the processing module updates a virtual dispersed storage network (DSN) to physical memory location table. In addition, the processing module may update a memory assignment table with a mapping of vaults to memories.

Figure 20:
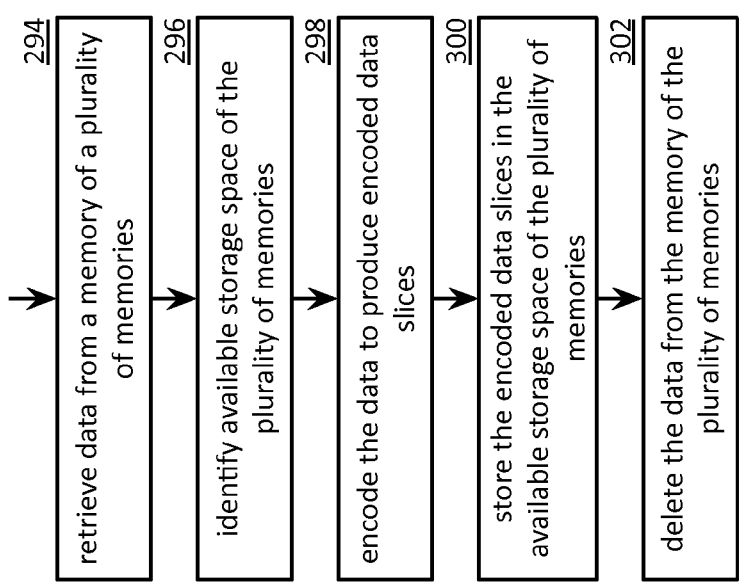
FIG. 20 is a flowchart illustrating an example of converting legacy data to dispersed data in accordance with the invention.
Figure 21:
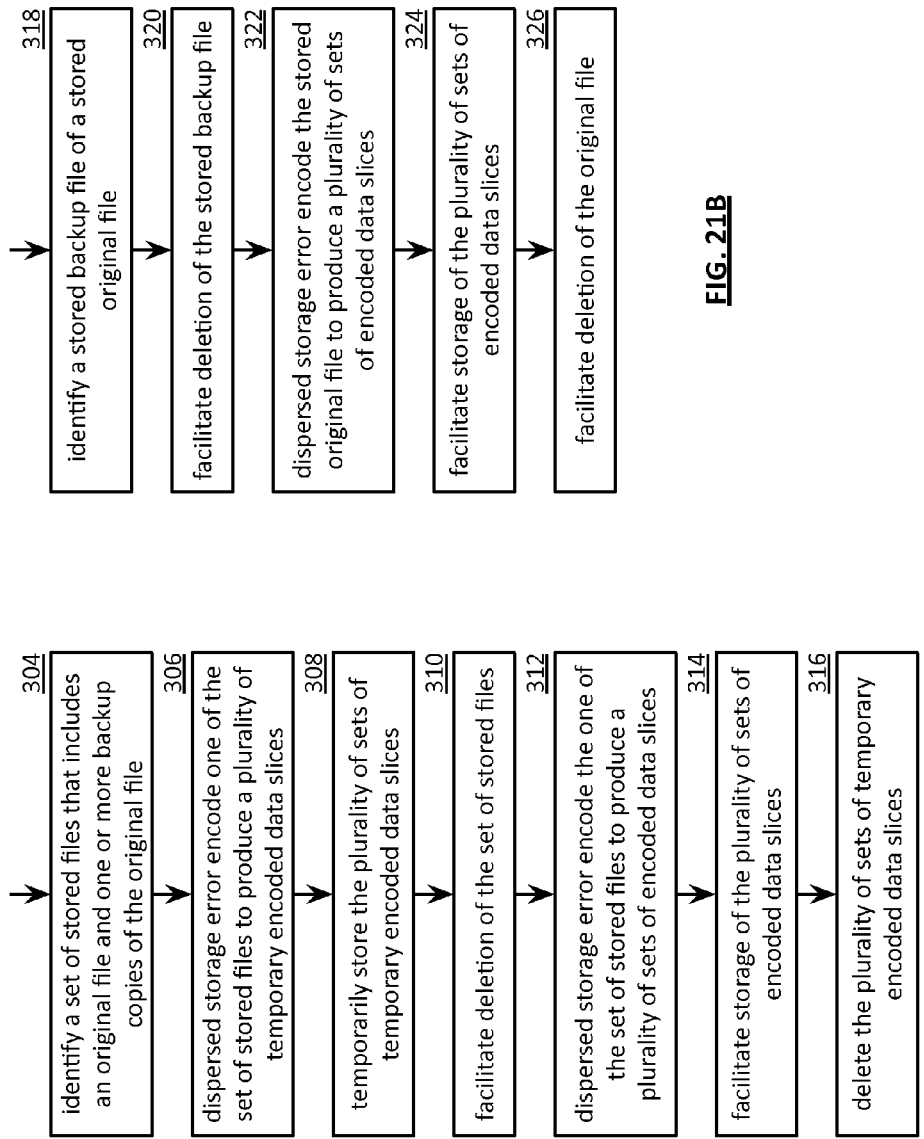
FIG. 21A is a flowchart illustrating another example of converting legacy data to dispersed data in accordance with the invention.
FIG. 21B is a flowchart illustrating another example of converting legacy data to dispersed data in accordance with the invention.

FIG. 20 is a flowchart illustrating an example of converting legacy data to dispersed data. The method begins with step 294 where a processing module (e.g., of a memory control module) retrieves data (e.g. legacy data that may not be in the form of encoded data slices) from a memory of a plurality of memories. For example, the memory may include a legacy memory in a legacy memory unit that contains a plurality of legacy memories each of which may be currently utilized to store legacy data. The method continues at step 296 where the processing module identifies available storage space of the plurality of memories. Available memory space includes memory that is unallocated and operable. The identification may be based on one or more of a query, a test, a memory status table, a lookup, a message, and a command.

The method continues at step 298 where the processing module encodes the data utilizing an error coding dispersal storage function to produce a plurality of sets of encoded data slices. The method continues at step 300 where the processing module stores the plurality of sets of encoded data slices in the available storage space of the plurality of memories. For example, the processing module stores the slices all in the memory (e.g., the same memory where the data was stored). As another example, the processing module stores all the slices in another memory. As yet another example, the processing module stores the slices in two or more of the memories.

The method continues at step 302 where the processing module deletes the data from the memory of the plurality of memories. In addition, the processing module deletes copies of the data from other memories of the plurality memories when other copies of the data exist. Note that an improvement to the system is provided by deleting the other copies of the data by freeing up more memory capacity to be utilized in the subsequent storage of more encoded data slices produced from still further data.

FIG. 21A is a flowchart illustrating another example of converting legacy data to dispersed data. The method begins at step 304 where processing module (e.g., of a memory control module) identifies a set of stored files that includes an original file and one or more back-up copies of the original file. The original file includes one or more of a data object and a data block. The identifying the set of stored files includes at least one of determining content of the one or more back-up copies substantially matches content of the original file, determining a function-based indicator (e.g., a hash digest, a deterministic function output, a mask generating function output) of the one or more back-up copies substantially matches a function-based indicator of the original file, determining a back-up indicator of the one or more back-up copies substantially identifies the original file, and determining a back-up indicator of the original file identifies the one or more back-up copies.

The method continues at step 306 where the processing module dispersed storage error encodes one of the set of stored files using a first set of dispersed storage error coding parameters to produce a plurality of sets of temporary encoded data slices. For example, uses a first set of dispersed storage error coding parameters that includes a pillar width of 8 and a decode threshold of 6 to produce the plurality sets of temporary encoded data slices such that a blowup factor is only 8/6=1.33.

The method continues at step 308 where the processing module temporarily stores the plurality of sets of temporary encoded data slices. For example, the processing module temporarily stores the plurality of sets of temporary encoded data slices in a memory that stores at least one of the one or more backup copies of the original file by overwriting the at least one of the one or more backup copies of the original file with the plurality of sets of temporary encoded data slices.

The method continues at step 310 where the processing module commences to facilitate deletion of the set of stored files after storage of the plurality of sets of temporary encoded data slices. The deleting the set of stored files includes at least one of immediately deleting the set of stored files and verifying storage of a plurality of sets of encoded data slices prior to deleting the set of stored files. For example, the processing module immediately deletes the set of stored files when the processing module successfully temporarily stores the plurality of sets of temporary encoded data slices. As another example, the processing module continues the method, as described below, to create and store the plurality of sets of encoded data slices prior to deleting the set of stored files when the processing module does not successfully temporarily store the plurality of sets of temporary encoded data slices.

The method continues at step 312 where the processing module dispersed storage error encodes a one of the set of stored files to produce the plurality of sets of encoded data slices. For example, the processing module retrieves the plurality of sets of temporary encoded data slices, dispersed storage error decodes the plurality of sets of temporary encoded data slices to reproduce the original file, and dispersed storage error encodes the original file to produce the plurality of sets of encoded data slices when the one of a set of stored files is not available. As another example, the processing module dispersed storage error encodes the one of the set of stored files to produce the plurality of sets of encoded data slices when the one of the set of stored files is available.

The method continues at step 314 where the processing module facilitates storage of the plurality of sets of encoded data slices in the memory as memory becomes available due to the deleting of the set of stored files. The facilitating storage of the plurality of sets of encoded data slices includes overwriting a back-up copy of the one or more back-up copies with at least some of the plurality of sets of encoded data slices and writing some other encoded data slices of the plurality of sets of encoded data slices to the memory that stores the plurality of sets of temporary encoded data slices. The method continues at step 316 where the processing module deletes the plurality of sets of temporary encoded data slices after storage of the plurality of sets of encoded data slices.

FIG. 21B is a flowchart illustrating another example of converting legacy data to dispersed data. The method begins at step 318 where a processing module (e.g., of a memory control module) identifies a stored back-up file of a stored original file. The identifying the stored back-up file includes at least one of determining content of the stored back-up file substantially matches content of the stored original file, determining a function-based indicator of the stored back-up file substantially matches a function-based indicator of the stored original file, determining a back-up indicator of the stored back-up file substantially identifies the stored original file, and determining a back-up indicator of the stored original file identifies the stored back-up file.

The method continues at step 320 where the processing module facilitates deletion of the stored back-up file. The facilitation includes at least one of writing at least one of zeros, ones, a random pattern, a dilution pattern to a memory associated with storing the backup file and sending a stored backup file deletion request (e.g., to the memory associated with the storing the backup file, to a file system).

The method continues at step 322 where the processing module dispersed storage error encodes the stored original file to produce a plurality of sets of encoded data slices. For example, the processing module utilizes a pillar width of 16 and a decode threshold of 10 to dispersed storage error encode the stored original file to produce the plurality of sets of encoded data slices when long-term storage is desired.

The method continues at step 324 where the processing module facilitates storage of the plurality of sets of encoded data slices. The facilitating storage of the plurality of sets of encoded data slices includes at least one of overwriting the stored back-up file with at least some of the plurality of sets of encoded data slices and overwriting the stored original file with other encoded data slices of the plurality of sets of encoded data slices. The method continues at step 326 where the processing module facilitates deletion of the original file after verification of the storage of the plurality of sets of encoded data slices.

Figure 22:
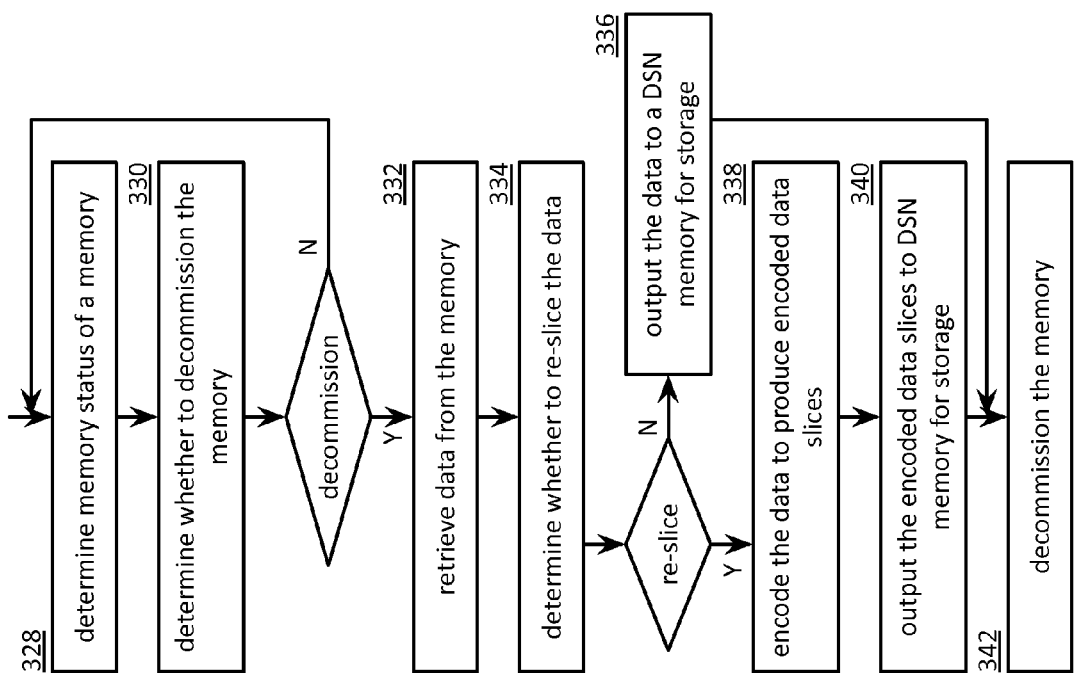
FIG. 22 is a flowchart illustrating an example of decommissioning a memory in accordance with the invention.
Figure 23:
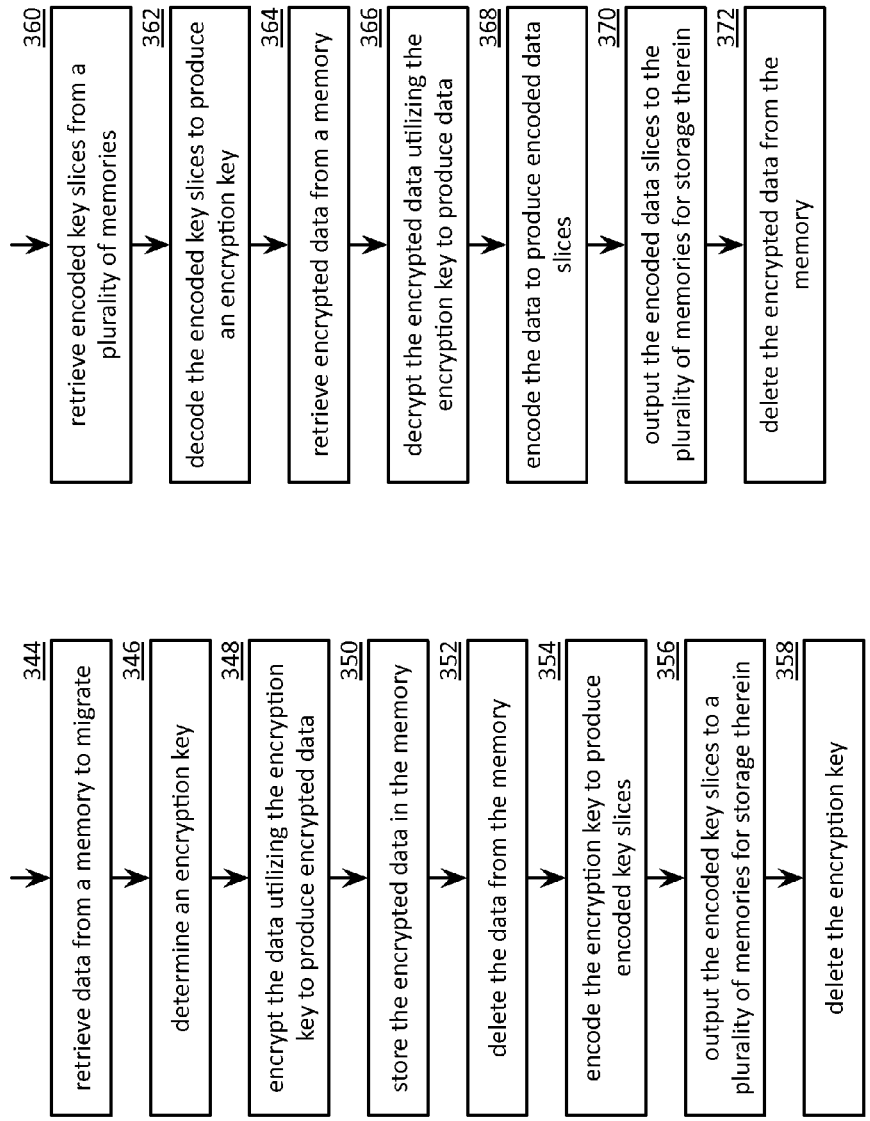
FIG. 23A is a flowchart illustrating an example of securing legacy data in accordance with the invention.
FIG. 23B is a flowchart illustrating an example of disperse storing secure legacy data in accordance with the invention.

FIG. 22 is a flowchart illustrating an example of decommissioning a memory. The method begins with step 328 where a processing module (e.g., of a memory control module) determines a memory status of a memory. The method continues at step 330 where the processing module determines whether to decommission the memory. The determination may be based on one or more of comparing the memory status to a status threshold, an error message, an error rate history, an error threshold, a message, and a command. For example, the processing module determines to decommission the memory when the memory status indicates an unusable state. The method branches to step 332 when the processing module determines to decommission the memory. The method repeats back step 328 when the processing module determines not to decommission the memory.

The method continues at step 332 where the processing module retrieves data (e.g., encoded data slices) from the memory. The method continues at step 334 where the processing module determines whether to re-slice the data (e.g., encode slices into sub-slices). The determination may be based on one or more of a memory status of one or more other memories within a dispersed storage network (DSN), storage requirements, lookup, a message, and a command. For example, the processing module determines to re-slice the data when a memory status level of each of a plurality of candidate memories compares unfavorably to storage requirements. The method branches to step 338 when the processing module determines to re-slice the data. The method continues to step 336 when the processing module determines not to re-slice the data. The method continues at step 336 where the processing module outputs the data to a dispersed storage network memory for storage (e.g., the processing module transfers encoded data slices from the memory to other memories of the DSN). The method branches to step 342.

The method continues at step 338 where the processing module encodes the data utilizing an error coding dispersal storage function to produce a plurality of sets of encoded data slices when the processing module determines to re-slice the data. For example, the processing module produces sub-slices for each slice. The method continues at step 340 where the processing module outputs the plurality of sets of encoded data slices to other memories of the DSN for storage therein. For example, the processing module outputs the plurality of sets of encoded data slices to other memories within a common dispersed storage (DS) unit wherein the memory is also within the common DS unit. The method continues at step 342 where the processing module decommissions the memory. For example, the processing module turns off the memory and updates a memory assignment table to indicate that the memory is unusable.

FIG. 23A is a flowchart illustrating an example of securing legacy data. The method begins at step 344 where a processing module (e.g., a memory control module) retrieves data from a memory to migrate. For example, the processing module retrieves legacy data from a legacy memory wherein the legacy memory is a memory of a plurality of memories of a legacy memory unit. The method continues at step 346 where the processing module determines an encryption key (e.g., lookup, based on a random number, based on a random seed, receiving). The method continues at step 348 where the processing module encrypts the data utilizing the encryption key and in accordance with an encryption function to produce encrypted data.

The method continues at step 350 where the processing module stores the encrypted data in the memory. The method continues at step 352 where the processing module deletes the data from the memory leaving the encrypted data intact in the memory. The method continues at step 354 where the processing module encodes the encryption key utilizing an error coding dispersal storage function to produce encoded key slices. The method continues at step 356 where the processing module outputs the encoded key slices to a plurality of memories for storage therein. For example, the plurality of memories is associated with the memory wherein the plurality of memories and the memory are part of a legacy memory unit. The method continues at step 358 where the processing module deletes the encryption key. In addition, the processing module may store memory locations associated with the storing of the encoded key slices.

FIG. 23B is a flowchart illustrating an example of disperse storing secure legacy data. The method begins with step 360 where a processing module (e.g., a memory control module) retrieves encoded key slices from a plurality of memories. For example, the plurality of memories is included in a legacy memory unit. The method continues at step 362 where the processing module decodes the encoded key slices utilizing an error coding dispersal storage function to produce an encryption key. The method continues at step 364 where the processing module retrieves encrypted data from a memory of the plurality of memories. The method continues at step 366 where the processing module decrypts the encrypted data utilizing the encryption key and in accordance with a decryption function to produce data.

The method continues at step 368 where the processing module encodes the data utilizing an error coding dispersal storage function to produce a plurality of sets of encoded data slices. The method continues at step 370 where the processing module outputs the plurality of sets of encoded data slices to at least some of the plurality of memories for storage therein. The method continues at step 372 where the processing module deletes the encrypted data from the memory.

Figure 24:
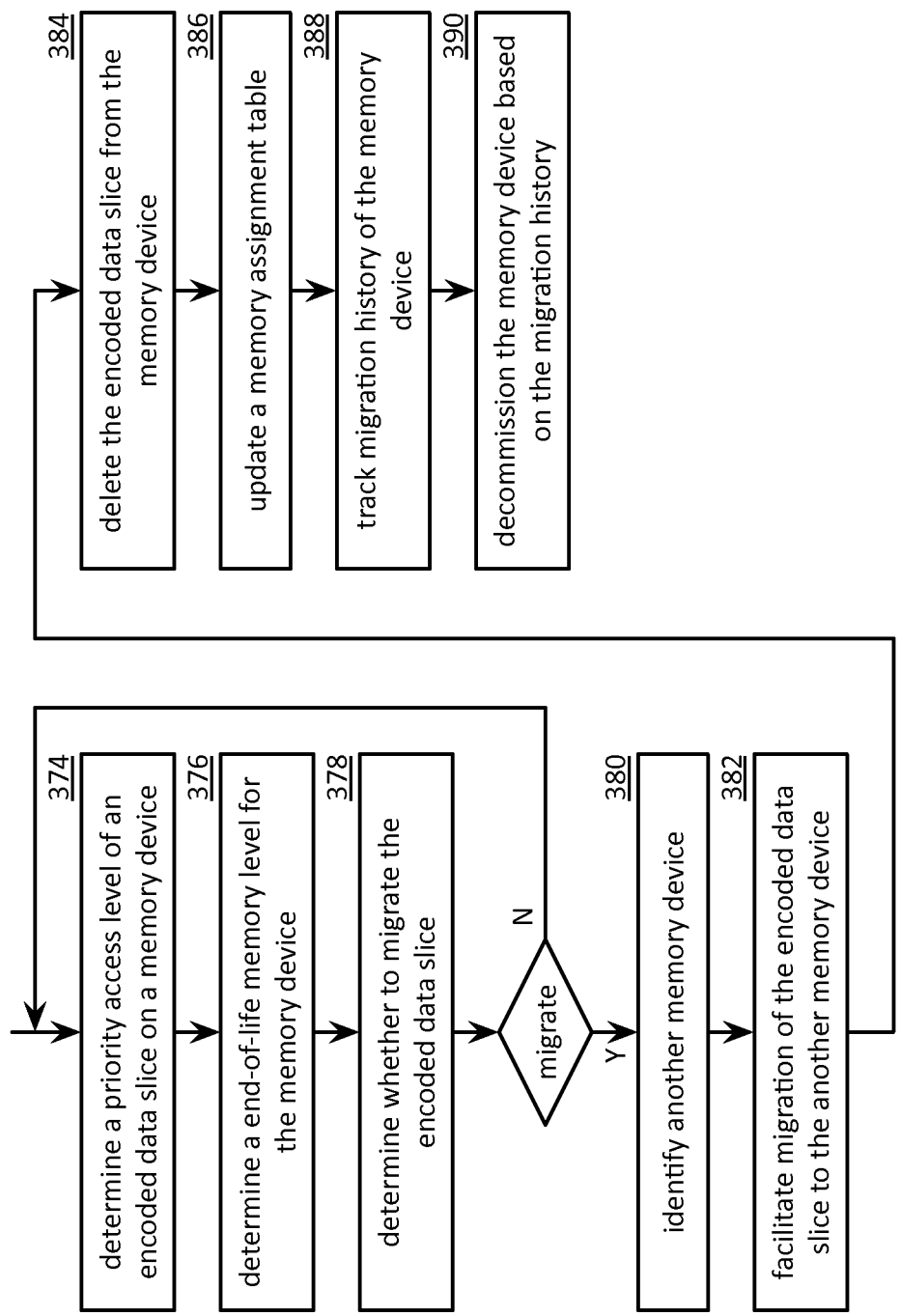
FIG. 24 is a flowchart illustrating another example of decommissioning a memory in accordance with the invention.

FIG. 24 is a flowchart illustrating another example of decommissioning a memory. The method begins with step 374 where a processing module (e.g., of a memory control module) determines a priority access level of an encoded data slice stored on a memory device. The determining the priority access level is based on at least one of a number of accesses of the encoded data slice, a service-level agreement, a data type indicator, a predetermination, a lookup, a priority level of data contained within the encoded data slice, a priority level of a user account associated with the encoded data slice, a message, and a command. The method continues at step 376 where the processing module determines an end-of-life memory level for the memory device. The determining the end-of-life memory level is based on at least one of a service life indicator, a historical performance record, an error message, an error rate, a performance test result, a predetermination, a query, a message, and a command.

The method continues at step 378 where the processing module determines whether to migrate the encoded data slice from the memory device based on the priority access level and the end-of-life memory level. The determining whether to migrate the encoded data slice includes at least one of comparing a representation of the priority access level and the end-of-life memory level to a sliding migration scale and indicating the migration of the encoded data slice when the representation compares unfavorably to the sliding migration scale. Such a representation includes one or more of transforming, weighting, and combining. For example, processing module generates the representation as a difference between the priority access level and the end-of-life memory level when the priority access level indicates a high frequency of access of the encoded data slice and the end-of-life memory level indicates a level 2 usability. In the example, the processing module indicates the migration of the encoded data slice when the representation is 1−2=−2 and compares unfavorably to a sliding migration scale of zero. As another example, the processing module does not indicate the migration of encoded data slice when the representation is 2−2=0 comparing favorably to the sliding migration scale of zero when the priority access level indicates a low-frequency of access and the end-of-life memory level indicates a level 2 usability. The method branches to step 380 when the processing module determines to migrate the encoded data slice. The method repeats back to step 374 when the processing module determines to not migrate the encoded data slice.

The method continues at step 380 where the processing module identifies another memory device. For example, the processing module identifies the other memory device from a list of available memory devices. The method continues at step 382 where the processing module facilitates migration of the encoded data slice to another memory device. The migrating the encoded data slice includes determining to replicate the encoded data slice and storing the encoded data slice in the other memory device. The storing the encoded data slice in the other memory device includes identifying the other memory device, determining another end-of-life memory level of the other memory device, comparing a representation of the priority access level and the other end-of-life memory level to a sliding migration scale, and facilitating storing the encoded data slice in the other memory device when the representation compares favorably to the sliding migration scale. For example, the processing module retrieves the encoded data slice from the memory device, identifies the another memory device that is associated with a another end-of-life memory level of 2 such that the representation of a priority access level of 2 and the other end-of-life memory level of 2 compares favorably to a sliding migration scale of 0 (e.g., 2−2=0), and stores the encoded data slice in the other memory device.

The method continues at step 34 where the processing module deletes the encoded data slice from the memory device. For example, the processing module writes zeros to the memory device. The method continues at step 386 where the processing module updates a memory assignment table to indicate that the other memory device is storing the encoded data slice. Alternatively, or in addition to, a processing module updates the memory assignment table to indicate that the memory device is no longer storing the encoded data slice. The method continues at step 388 where the processing module tracks migration history of encoded data slices from the memory device. Alternatively, the processing module tracks the migration history from time to time independent of considering the priority access level of the encoded data slice on the memory device. The tracking of the migration history includes at least one of receiving the migration history, querying an event log, marking a history table when an encoded data slice is migrated from the memory device, and summarizing migration history.

The method continues at step 390 where the processing module decommissions the memory device based on the migration history. Decommissioning includes at least one of turning off power to the memory device, marking the memory device as unusable in a memory status table, sending an error message, activating a hot standby memory device, facilitating transferring remaining slices stored within the memory device, and updating the memory assignment table.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
    identifying a memory device having an expired useable memory life with respect to a legacy storage protocol;
    extracting data from the memory device; and
    reprovisioning the memory device from the legacy storage protocol to a dispersed storage error coding storage protocol to produce a reprovisioned memory device that is useable for storing data in accordance with the dispersed storage error coding storage protocol.

2. The method of claim 1, wherein the reprovisioning the memory device comprises one or more of:
    establishing a local storage table that indicates a mapping of slice names to memory device addresses within a dispersed storage network (DSN) memory;
    writing a plurality of zeros to the memory device;
    writing a plurality of ones to the memory device;
    writing a sequence of a plurality of zeros and ones to the memory device;
    writing random data to the memory device; and
    verifying that performance of the memory device within the DSN memory is in accordance with the dispersed storage error coding storage protocol.

3. The method of claim 1, wherein the reprovisioning the memory device comprises:
    integrating the memory device into a dispersed storage network (DSN) memory.

4. The method of claim 3 further comprises at least one of:
    converting the data extracted from the memory device from the legacy storage protocol to the dispersed storage error coding storage protocol to produce dispersed storage error encoded data; and
    storing at least a portion of the dispersed storage error encoded data in the DSN memory in accordance with the dispersed storage error coding storage protocol.

5. The method of claim 1, wherein the reprovisioning the memory device further comprises:
    determining a memory device usability level of the memory device; and
    reprovisioning the memory device into the DSN memory in accordance with the memory device usability level.

6. The method of claim 5, wherein the memory device usability level comprises at least one of:
    a data retrieval failure rate;
    a memory element failure;
    a mechanical disk operational issue; and
    a data write verification issue.

7. The method of claim 1 further comprises prior to expiration of the useable memory life:
    identifying the memory device for reprovisioning based on at least one of:
        a network management message;
        a user input;
        an error message;
        a configuration message;
        an available memory message;
        a memory device insertion detector output;
        a message; and
        a command.

8. A dispersed storage network (DSN) memory system comprises:
    a plurality of memory devices configured to store data in accordance with a dispersed storage error coding storage protocol; and
    a memory device has an expired useable memory life with respect to a legacy storage protocol, wherein legacy data stored on the memory device in accordance with the legacy storage protocol has been extracted, and wherein the memory device has been reprovisioned from the legacy storage protocol to be useable for storing data in accordance with the dispersed storage error coding storage protocol.

9. The DSN memory system of claim 8 further comprises:
    a processing module operable to reprovision the memory device by at least one of:
        establishing a local storage table that indicates a mapping of slice names to memory device addresses within the dispersed storage network (DSN) memory system;
        writing a plurality of zeros to the memory device;
        writing a plurality of ones to the memory device;
        writing a sequence of a plurality of zeros and ones to the memory device;
        writing random data to the memory device; and
        verifying that performance of the memory device within the DSN memory system is in accordance with the dispersed storage error coding storage protocol.

10. The DSN memory system of claim 9, wherein the processing module is further operable to:
    convert the legacy data from the legacy storage protocol to the dispersed storage error coding storage protocol to produce dispersed storage error encoded data; and
    store at least a portion of the dispersed storage error encoded data in the DSN memory system in accordance with the dispersed storage error coding storage protocol.

11. The DSN memory system of claim 9, wherein the processing module is further operable to:
    determine a memory device usability level of the memory device; and
    reprovision the memory device into the DSN memory system in accordance with the memory device usability level.

12. The DSN memory system of claim 11, wherein the memory device usability level comprises at least one of:
    a data retrieval failure rate;
    a memory element failure;
    a mechanical disk operational issue; and
    a data write verification issue.

13. The DSN memory system of claim 9, wherein the processing module is further operable to prior to expiration of the useable memory life:
    identify the memory device for reprovisioning based on at least one of:
        a network management message;
        a user input;
        an error message;
        a configuration message;
        an available memory message;
        a memory device insertion detector output;
        a message; and
        a command.

* * * * *